United States Patent
Tada et al.

(10) Patent No.: US 11,218,535 B2
(45) Date of Patent: Jan. 4, 2022

(54) INFORMATION PROCESSING APPARATUS, INFORMATION PROCESSING METHOD, AND COMPUTER PROGRAM

(71) Applicant: SONY CORPORATION, Tokyo (JP)

(72) Inventors: Kenta Tada, Tokyo (JP); Masahiro Tamori, Kanagawa (JP); Takamori Yamaguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 208 days.

(21) Appl. No.: 16/493,998

(22) PCT Filed: Feb. 28, 2018

(86) PCT No.: PCT/JP2018/007518
§ 371 (c)(1),
(2) Date: Sep. 13, 2019

(87) PCT Pub. No.: WO2018/190015
PCT Pub. Date: Oct. 18, 2018

(65) Prior Publication Data
US 2020/0036774 A1    Jan. 30, 2020

(30) Foreign Application Priority Data

Apr. 12, 2017 (JP) .............................. JP2017-079298

(51) Int. Cl.
*H04L 29/08* (2006.01)
*G06F 8/65* (2018.01)
(Continued)

(52) U.S. Cl.
CPC ................ *H04L 67/10* (2013.01); *G06F 8/65* (2013.01); *G06F 9/455* (2013.01); *G06F 9/54* (2013.01); *H04L 67/26* (2013.01); *H04L 67/28* (2013.01)

(58) Field of Classification Search
CPC ........................................................ G06F 8/65
(Continued)

(56) References Cited

U.S. PATENT DOCUMENTS 9,471,775 B1 * 10/2016 Wagner ................... H04L 63/20
2004/0255287 A1 * 12/2004 Zhang ..................... G06F 8/656
717/171
(Continued)

FOREIGN PATENT DOCUMENTS

JP    2003-334785 A    11/2003
JP    2010-514028 A     4/2010
(Continued)

OTHER PUBLICATIONS

Mar. 23, 2020, European Search Report issued for related EP Application No. 18784792.6.

*Primary Examiner* — Wing F Chan
*Assistant Examiner* — Leon Y Tseng
(74) *Attorney, Agent, or Firm* — Paratus Law Group, PLLC

(57) ABSTRACT

Provided are an information processing apparatus, an information processing method, and a computer program each processing an application or a program included in an application. The information processing apparatus includes: a starting section that starts a second container separated from a first container where a first node operates to start a second node in the second container; and a proxy managing section that starts a proxy node performing data communication with the first node in the first container on the basis of a predetermined communication model, and performing data communication with the second node in the second container on the basis of the predetermined communication model.

14 Claims, 27 Drawing Sheets

(51) Int. Cl.
*G06F 9/455* (2018.01)
*G06F 9/54* (2006.01)

(58) Field of Classification Search
USPC .......................................... 709/201
See application file for complete search history.

(56) References Cited

U.S. PATENT DOCUMENTS

| | | |
|---|---|---|
| 2009/0228563 A1 | 9/2009 | Jones et al. |
| 2013/0166703 A1* | 6/2013 | Hammer ................ H04L 63/10 |
| | | 709/220 |

FOREIGN PATENT DOCUMENTS

| | | |
|---|---|---|
| JP | 2011-514087 A | 4/2011 |
| JP | 2013-041445 A | 2/2013 |
| JP | 2016-515267 A | 5/2016 |
| WO | WO 2016/126731 A1 | 8/2016 |

* cited by examiner

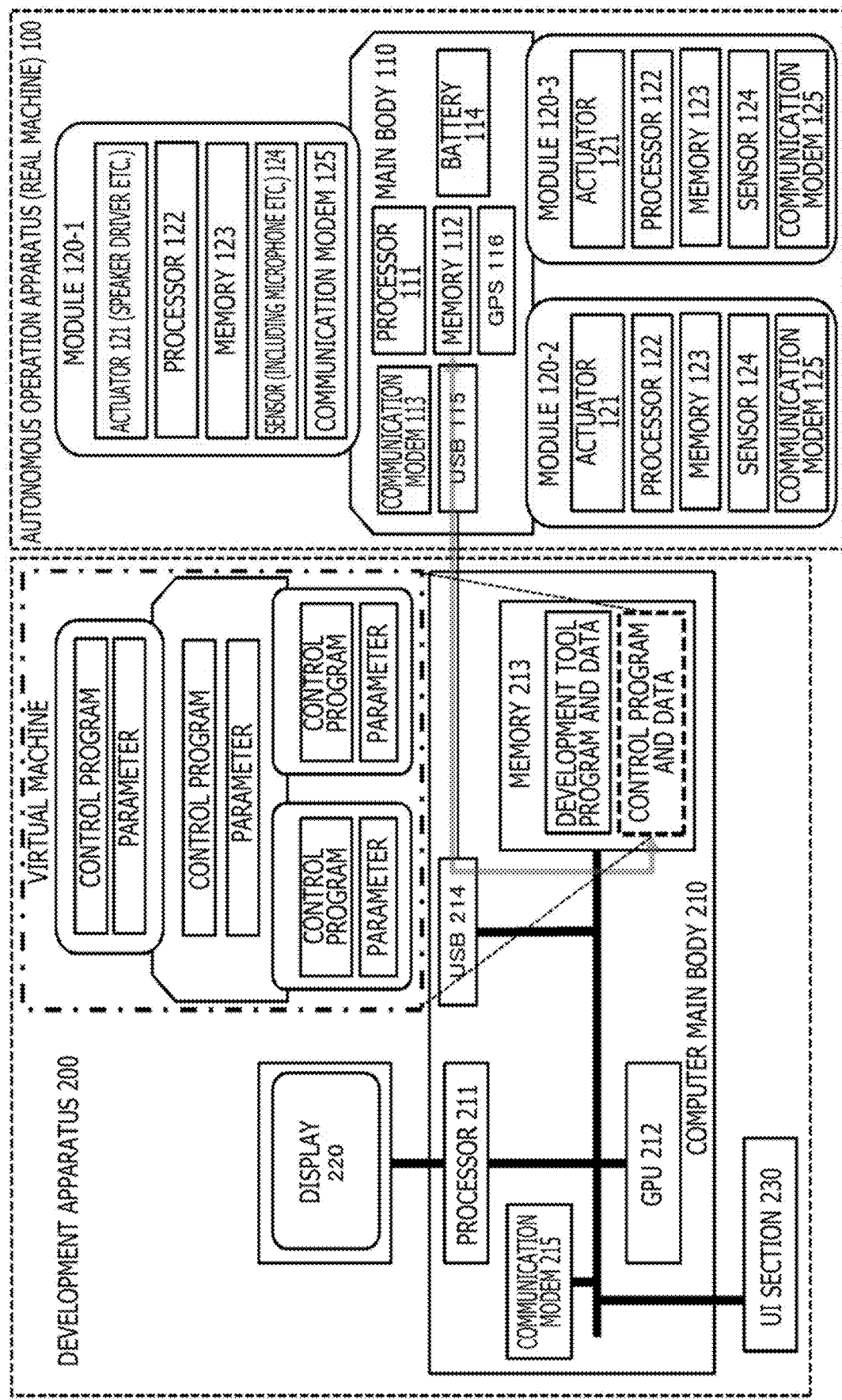
F I G. 1

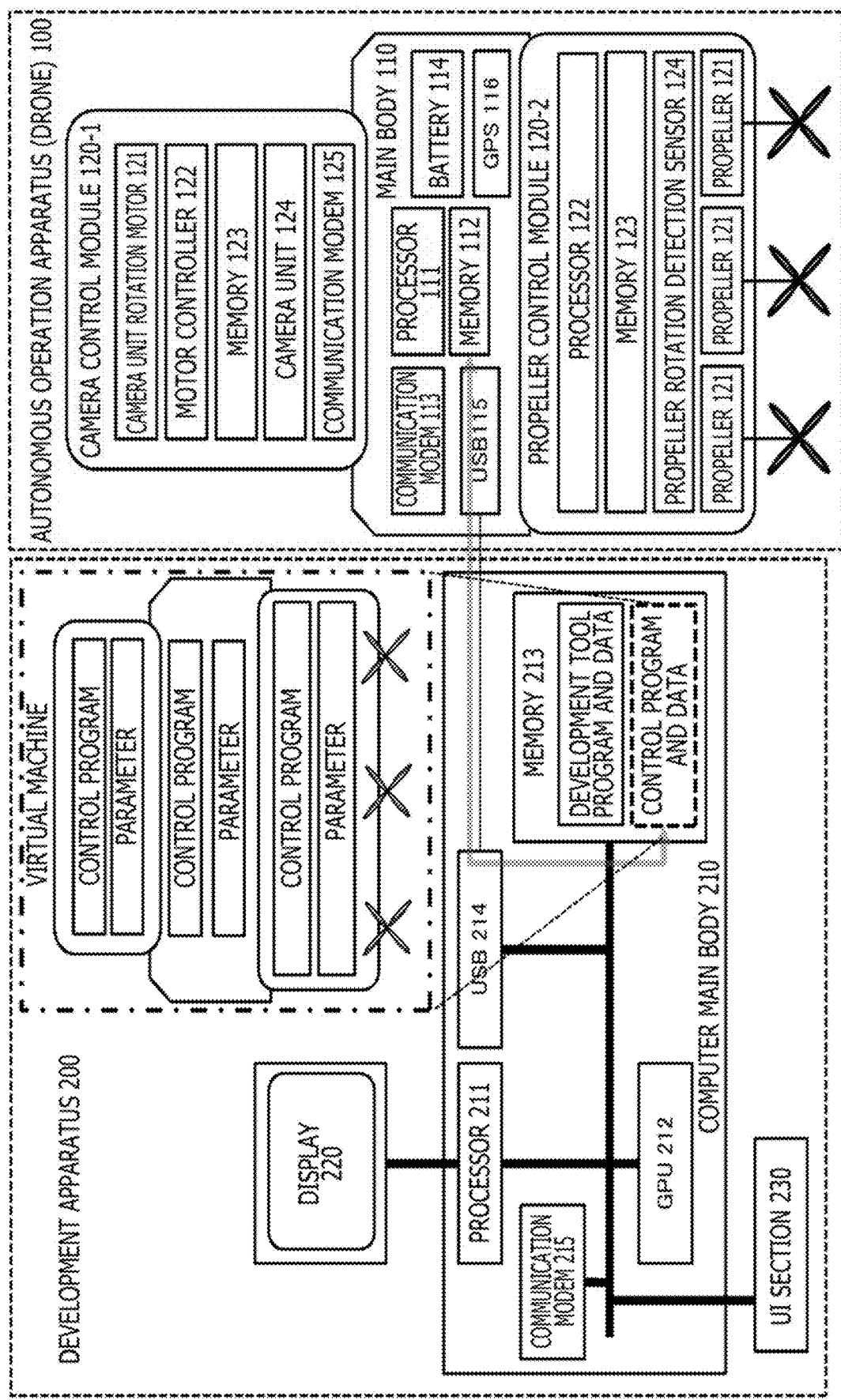
F I G . 5

FIG. 8

APPLICATION REQUESTING REGISTRATION FOR PROXY MANAGER

```
1 #include "ros/ros.h"
2 #include "std_msgs/String.h"
3
4 int main(int argc, char **argv)
5 {
6   ros::init(argc, argv, "talker");
7   ros::NodeHandle n;
8   ros::Publisher chatter_pub = n.advertise<std_msgs::String>("T REGISTRATION TOPIC NAME 1", 1000);
(SNIP)
```

SET AND CONSTRUCT SO AS TO USE REQUESTED TOPIC ON SOURCE CODES

INFORMATION PROCESSING APPARATUS, INFORMATION PROCESSING METHOD, AND COMPUTER PROGRAM

CROSS REFERENCE TO PRIOR APPLICATION

This application is a National Stage Patent Application of PCT International Patent Application No. PCT/JP2018/007518 (filed on Feb. 28, 2018) under 35 U.S.C. § 371, which claims priority to Japanese Patent Application No. 2017-079298 (filed on Apr. 12, 2017), which are all hereby incorporated by reference in their entirety.

TECHNICAL FIELD

A technology disclosed in the present description relates to an information processing apparatus, an information processing method, and a computer program, each processing an application or a program included in an application.

BACKGROUND ART

Artificial intelligence (AI) and automation technologies have made remarkable progress in recent years, and are widely spreading in workplaces of various industrial fields. For example, a robot includes a plurality of links, joints connecting the links, and operates by driving of the respective joints using a joint driving actuator such as a motor. In addition, an autonomous vehicle detects information around the vehicle using sensors, so that it is possible to avoid collisions and the like in accordance with autonomous determination.

A system called autonomous type or adaptive control type, such as a robot, autonomously or adaptively performs behavior control without waiting for instructions from an operator or a master apparatus. More specifically, the system constantly verifies (or evaluates or monitors) an outside environment or an inside condition of a robot or the like, and sequentially starts an operation which produces a result suitable for a predetermined transition condition concerning recognition of the outside environment or the inside condition to achieve an action suitable for a current situation (e.g., see PTL 1). Meanwhile, development and manufacture of a system by a single developer become more difficult as complexity of the system increases. Accordingly, a system is generally developed by a plurality of developers. Following several problems may arise when one system is developed by a plurality of developers.

(1) In the case of a system which receives input from sensors or the like having various functions and manages operation of the system used in various modes, a pre-test considering any events has become more difficult to conduct for the system.

(2) A part of the plurality of developers may incorporate a library or the like developed in open sources for a long period of time, such as Linux (registered trademark) operating system (OS) which is a typical example. In this case, management of software quality has become more difficult.

(3) A part of the system may be developed by developers having different management, references or the like of development steps and product operation checking tests. Accordingly, since a manner of checking the product operation or the like differs among developers, in a case where operation failure, malfunction, or a security problem is found at the time of operating the product, rapid and appropriate solutions for such problems have been more demanded than before.

Meanwhile, when a computer system executes an application program, a computer process operating on a processor (hereinafter also abbreviated as a "process") is generated, and managed by an OS. A real-time OS (RTOS) designed to execute respective processes in a scheduled time may be used for a purpose of development of a complex system which places importance on reaction speed performance during real-time processing, such as a robot. For example, a recent RTOS is allowed to use a publisher/subscriber type communication model for communication between individual processes generated and managed by the OS in accordance with a plurality of application programs operating on a system (e.g., see PTL 2).

In the OS using the communication model described above, it is possible to establish communication in a condition in which a process generated for each application program does not recognize beforehand a process generated for a specific application program of a communication partner. Accordingly, addition of a new application program to a system, or change of a part of an application program during execution is achievable relatively easily. However, there also arises such a problem that execution performance or a security problem of the application program newly added or changed during execution is difficult to test beforehand.

CITATION LIST

Patent Literature

[PTL 1]
   JP 2003-334785 A
[PTL 2]
   JP 2011-514087 T

SUMMARY

Technical Problems

An object of a technology of the present specification is to provide an information processing apparatus, an information processing method, and a computer program, each provided with an OS which uses a communication method for easily newly adding an application program, and each capable of managing an application program (or a process generated from an application program) separately from another application program (or a process) by a predetermined method, and solving the aforementioned problems by a communication method between the processes separately managed.

Solution to Problems

The technology disclosed in the present specification has been achieved in consideration of the aforementioned problems. A first aspect of the technology is directed to an information processing apparatus including: a starting section that starts a second container separated from a first container where a first node operates to start a second node in the second container; and a proxy managing section that starts a proxy node performing data communication with the first node in the first container on the basis of a predetermined communication model, and performing data communication with the second node in the second container on the basis of the predetermined communication model. Herein, the first node includes a node operating by installing a first application that meets a predetermined condition in the first container. The starting section installs a second application that does not meet the predetermined condition in the second container to cause the second node to operate.

The starting section starts the second container including an address or a name space logically separated from the first container by a virtual NIC. In addition, the predetermined communication model includes a publisher/subscriber type communication model, and the starting section designates a topic name shared with the second container to start the proxy node.

Subsequently, the first node transmits data associated with a first topic provided by the proxy node in the first container, the proxy node creates a second topic in the second container associated with the first topic, and transmits the data received from the first node, and the second node receives the data from the second topic.

In addition, the second node transmits data associated with a second topic provided by the proxy node in the second container, the proxy node creates a first topic in the first container associated with the second topic, and transmits the data received from the second node, and the first node receives the data from the first topic.

Moreover, a second aspect of the technology disclosed in the present specification is directed to an information processing method including: a starting step of starting a second container separated from a first container where a first node operates to start a second node in the second container; and a proxy managing step of starting a proxy node performing data communication with the first node in the first container on the basis of a predetermined communication model, and performing data communication with the second node in the second container on the basis of the predetermined communication model.

Furthermore, a third aspect of the technology disclosed in the present specification is directed to a computer program written in a computer-readable form, causing a computer to function as: a starting section that starts a second container separated from a first container where a first node operates to start a second node in the second container; and a proxy managing section that starts a proxy node performing data communication with the first node in the first container on the basis of a predetermined communication model, and performing data communication with the second node in the second container on the basis of the predetermined communication model.

The computer program according to the third aspect of the technology disclosed in the present specification defines a computer program written in a computer-readable form so as to implement predetermined processes on a computer. In other words, by installing the computer program according to the third aspect of the technology disclosed in the present specification in a computer, cooperative operations are achievable on a computer, so that operational advantageous effects similar to those of the information processing apparatus according to the first, aspect can be obtained.

Advantageous Effect of Invention

According to the technology disclosed in the present specification, it is possible to provide an information processing apparatus, an information processing method, and a computer program each provided with an OS which uses a communication method for easily newly adding or changing an application program, and each capable of managing an application program (or a process generated by a program) separately from a different application program (or a process) by a predetermined method, and solving the aforementioned problems by using a communication method between the processes separately managed.

Note that advantageous effects described in the present specification are examples only, and advantageous effects of the present invention are not limited to this. The present invention may further offer additional advantageous effects as well as the advantageous effects described above in some cases.

Other objects, features, and advantages of the technology disclosed in the present specification will become apparent from more detailed description of embodiments described below and accompanying drawings.

BRIEF DESCRIPTION OF DRAWINGS

FIG. 1 is a diagram schematically depicting an example of a development environment of a control program.

FIG. 5 is a diagram depicting an example of a development environment of a control program for an unmanned aerial vehicle (drone) corresponding to a development target.

FIG. 8 is a diagram depicting an example of source codes of an application program subjected to registration request.

DESCRIPTION OF EMBODIMENTS

Figure 2:
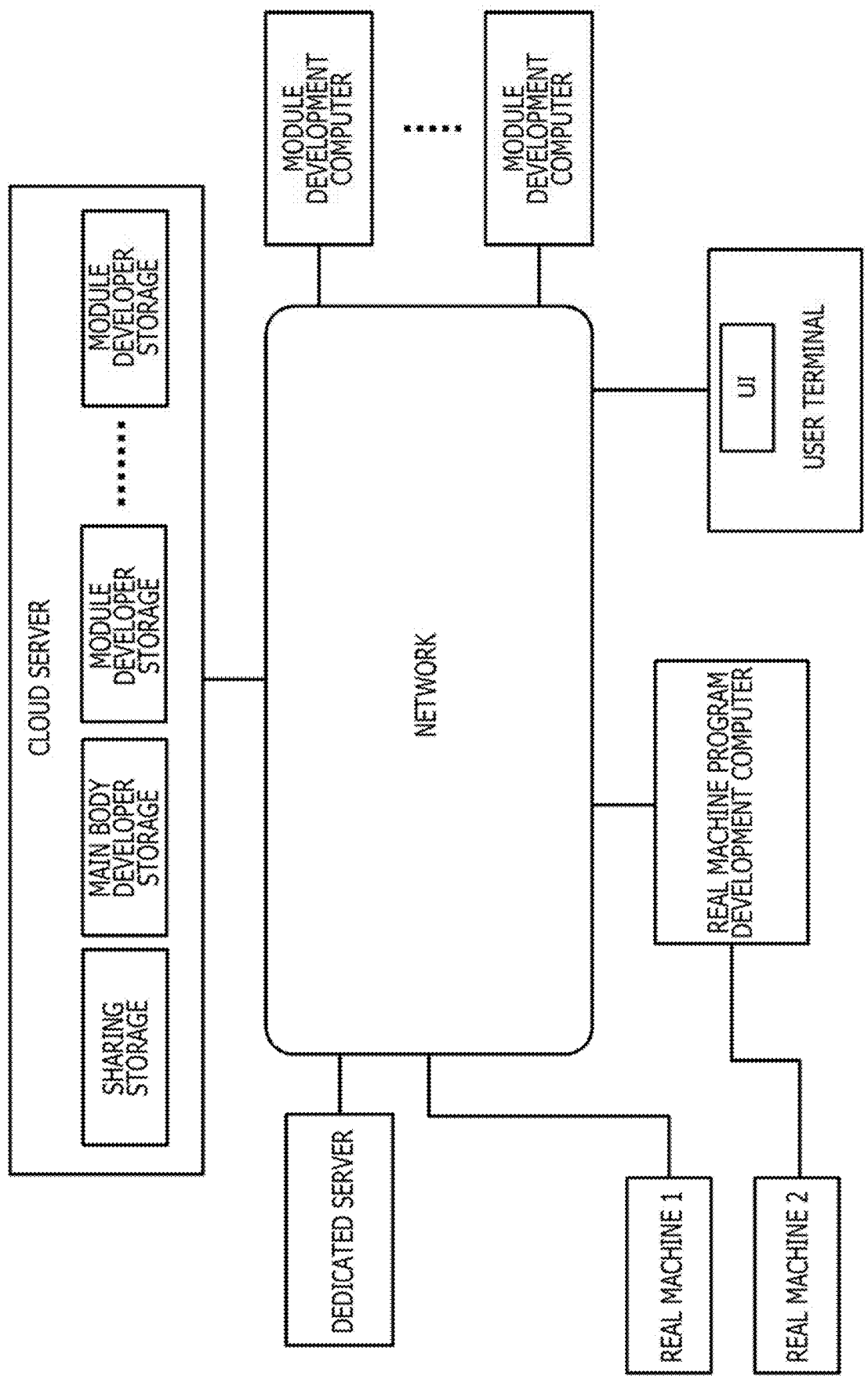
FIG. 2 is a diagram depicting an example of a distributed development environment of a control program via a network.

Embodiments of the technology disclosed in the present specification are hereinafter described in detail with reference to the drawings.

FIG. 1 is a diagram schematically depicting an example of a development environment of a control program. An autonomous operation apparatus (real machine) 100 which corresponds to a control target of the control program, and a development apparatus 200 which creates the control program of the autonomous operation apparatus 100 are disposed under the development environment.

It is assumed herein that the autonomous operation apparatus 100 is an apparatus for controlling behaviors of the autonomous operation apparatus 100 by autonomous or adaptive control. Examples of the autonomous operation apparatus 100 include a robot, an unmanned aerial vehicle, an automobile performing autonomous driving, and various other modes.

The autonomous operation apparatus 100 includes a main body 110 integrally controlling overall operation of the system 100, a plurality of modules 120-1 and 120-2, and others. FIG. 1 depicts only three modules for simplification. However, the autonomous operation apparatus 100 assumed herein may include four or more modules, or only two or less modules.

Each of the modules 120 includes an actuator 121, a processor 122, a memory 123, a sensor 124, and a communication modem 125. Note that the respective parts 121 to 125 within each of the modules 120 are connected to each other via an internal bus. This connection is not depicted in the figure for simplification.

For example, the actuator 121 is a motor for rotating a joint, or a driver for a speaker. The sensor 124 is a sensor for detecting an output state of the actuator, such as joint rotation angle, angular speed, and speaker volume, a sensor for detecting external force or other outside environments, or other sensors.

The processor 122 controls operation within each of the modules 122, such as typical operation including driving control of the actuator 121 (motor controller), and recognition processing for detection signals from the sensor 124. The memory 123 is used by the processor 122 to store control information associated with the actuator, detection values obtained by the sensor, and others.

The communication modem 125 is hardware achieving mutual communication between the module 120 and the main body 110, or between the module 120 and the other modules, and may be either a wireless modem or a wired modem. For example, the processor 122 receives an instruction signal for driving of the actuator 121 or other actions from the main body 110 via the communication modem 125, and transmits detection data obtained by the sensor 124 to the main body 110 via the communication modem 125. Each of the modules 120 is also capable of communicating with an external apparatus such as the development apparatus 200 via the communication modem 125.

The main body 110 includes a processor 111, a memory 112, a communication modem 113, a battery 114, a USB (Universal Serial Bus) port 115, and a GPS (Global Positioning System) 116. Note that the respective parts 111 to 116 within the main body 110 are connected to each other via an internal bus. This connection is not depicted in the figure for simplification.

The processor 111 integrally controls overall operation of the autonomous operation apparatus 100 under programs stored in the memory 112. In addition, the battery 114 as a driving power supply of the autonomous operation apparatus 100 supplies power to the main body 110 and the respective modules 120.

The communication modem 113 is hardware achieving mutual communication between the main body 120 and the respective modules 120, and may be either a wireless modem or a wired modem. For example, the processor 111 transmits an instruction signal for driving of the actuator 121 or other actions to each of the modules 120 via the communication modem 113, and receives a recognition result based on a detection value obtained by the sensor 122 within each of the modules 120 via the communication modem 113. The main body 110 is also capable of communicating with an external apparatus such as the development apparatus 200 via the communication modem 113.

The USB port 115 is used to connect an external device to the main body 110 using a USB bus (cable). It is assumed in the present embodiment that the development apparatus 200 is connected to the main body 110 using the USB port 115. For example, a control program created by the development apparatus 200 can be installed into the autonomous operation apparatus 100 via the USB port 115. Note that USB is an example of interface standards for connecting an external apparatus to the autonomous operation apparatus 100. Connection of an external apparatus may be achieved in conformity with other interface standards.

Note that a data bus and a control bus are present to connect the main body 110 and hardware such as the respective modules 120. The data bus and the control bus are not depicted in the figure.

The development apparatus 200 includes a personal computer, for example, and includes a computer main body 210, a display 220 such as a liquid crystal panel, and a user interface (UI) section 230 including a mouse, a keyboard, and the like. In addition, the computer main body 210 includes a processor 211, a GPU (Graphic Processing Unit) 212, a memory 213, a USB port 214, and a communication modem 215. However, adoptable is such a configuration example in which a function of the GPU 212 is included in the processor 211. The computer main body 210 may further include hardware constituent elements other than the parts depicted in the figure. The respective elements are connected to each other via a bus.

An OS operates in the development apparatus 200. The processor 211 is capable of loading a desired application program into the memory 212, and executing the application program under an execution environment provided by the OS.

According to the present embodiment, a development tool program for creating a control program of the autonomous operation apparatus 100 is assumed as one of application programs. This development tool program is loaded onto the memory 213 of the development apparatus 200 together with data necessary for execution of the program.

The development tool program presents a GUI (Graphical User Interface) for program development on a screen of the display 220. A program developer is allowed to input data and programs via the user interface 230 while checking contents of the GUI screen. In addition, the development tool program has functions such as a function for checking operation of a control program using compiler, debugger, simulation, and 3D graphics animation concerning a created control program. The developer is allowed to issue instructions for executing these functions on the GUI screen.

A control program created using the development tool program includes a control program executed on the processor 111 of the main body 110 mounted on the real machine of the autonomous operation apparatus 100 and data such as parameters used by the control program, and a control program for controlling driving of the actuator 121 in the processor 122 of each module 120 and data such as parameters used by the control program. In the present specification, a program part and data may be also collectively referred to as a "control program."

The control program created using the development tool program is stored in the memory 213. In addition, the control program in the memory 213 is transferable to the autonomous operation apparatus 100 side via the USB port 214. Alternatively, the control program in the memory 213 is transferable to the modules 120 in the autonomous operation apparatus 100 via the communication modem 215.

Moreover, the control program created by the development apparatus 200 using the development tool program can verify operation, and correct, control data and programs using a development tool program and data in which 3D graphics animation is used (development tool program and data are hereinafter collectively referred to as a "development tool program"). In general, the development tool program of this type has a function of creating 3D graphics animation of real machine operation of the autonomous operation apparatus 100 under the control program. Accordingly, the developer is capable of verifying operation of a control program developed by the developer, and correcting data and programs in parallel using 3D graphics animation displayed on the display 220.

It is assumed in the present embodiment that the development tool program has a function of what is called a physics engine. The physics engine is a computer program which has a function of calculating a physical phenomenon of actual operation of the autonomous operation apparatus 100 on the basis of physical rules. The physics engine creates an operation similar to an actual operation while considering physical characteristics of the autonomous operation apparatus 100 and further an actual external environment, and displays a result of the operation on the display 220. The virtual autonomous operation apparatus 100 operating in a 3D graphics animation space using the physics engine instead of a real machine motor or the like is also referred to as a virtual machine (computer program and data including 3D graphics animation data) in contrast to the real machine as the autonomous operation apparatus 100.

When the autonomous operation apparatus 100 is a robot, for example, the physics engine calculates a physical reaction expressed in a development tool program and caused between a virtual physical environment and a virtual machine imitating the robot (reaction such as contact with a ground surface and collision with an obstacle) on the basis of physical rules in an operation of a control program of the virtual machine. This calculation is performed in consideration of weights and moments of respective links and joints of an arm of the robot, and characteristics of a joint driving actuator to calculate overall operation of the virtual machine as if the actuator of the robot actually drives. The physics engine then displays, on the display 220, 3D graphics animation in which an actual operation of the robot is reproduced using the virtual machine.

The virtual machine includes a control program configured to operate on a development tool program including the physics engine and 3D graphics animation, and data associated with the control program, and is stored in the memory 213. It is preferable that the control program and data are provided in a form of modules in units of operation in the processor 122 of each of the modules 120 of the real machine 100. The control program of the virtual machine implements a function corresponding to operation of the processor (e.g., motor controller) 122 of the real machine 100 as a part of the program to operate the virtual machine in a 3D graphics space in a manner similar to the manner of the real machine. In addition, the control program of this virtual machine is so programmed as to call, using an API (Application Programming Interface) or a function, a physics engine function which reproduces an operation corresponding to the actuator 121 (e.g., motor) of each of the modules 120 of the real machine 100 by using 3D graphics animation. Furthermore, data used during physical calculation by the physics engine (e.g., control parameters set for the actuator, weights of the links, and inertia) is stored in the memory 213 together with the control program. This data is read from the memory 213 and used in the control program in response to execution of the control program.

In addition, the API or the function for issuing an instruction to a program module for implementing the physics engine function is set identical to that provided by a basic OS operating on the real machine, i.e., autonomous operation apparatus 100 side, so that it is possible to cause a program created by the development tool program to operate on the OS of the real machine as it is. Furthermore, since an actual physical phenomenon can be reproduced by the physics engine function, a program developed using the development tool program is uploaded via the USB port 214 or the like to the autonomous operation apparatus 100 to be executed without any change, and accordingly, an operation which has been checked by the development tool program can be achieved on the actual machine as well.

In addition, the control program of the autonomous operation apparatus 100 may be divided into modules and developed in units of module using the development tool program. In this case as well, the control program can be uploaded to the autonomous operation apparatus 100 in a similar manner in units of the module 120. For example, a developer in charge of development of the hardware and the control program of only the module 120-1 connects the development apparatus 200 of the developer to the corresponding module 120-1 of the autonomous operation apparatus 100 via the communication modem 215, and can upload a created program and data to the memory 123 in the module 120-1.

Development in hardware and program is shared by a plurality of developers or a plurality of development vendors in units of the module 120, so that development of the entire autonomous operation apparatus 100 can be advanced under a distributed development environment.

FIG. 2 depicts an example of a distributed development environment of a control program via a network. Under the distributed development environment depicted in FIG. 2, each of the modules is developed by a corresponding individual developer or development vendor. However, the module depicted in FIG. 2 may indicate a module of control software of the autonomous operation apparatus 100 as well as each of the modules 120 corresponding to hardware constituent elements of the autonomous operation apparatus 100 depicted in FIG. 1.

Each of the program developers in charge of development of a control program in units of the main body or module of the autonomous operation apparatus 100 creates a control program of the main body 110 or the module 120 to be developed by the corresponding program developer using a module development computer. For example, the development tool program described above operates on the module development computer. Each of the module development computers is connected to a network. In this case, each of the program developers may provide a control program or the like developed by the corresponding program developer in a sharing storage on a cloud server or a personal use storage (i.e., main body developer storage, module developer storage) on a cloud server, or a storage included in a dedicated server. Moreover, a control program or the like may be configured so as to be shared by a manager, a developer, a customer, or a user each having an account for a storage such as a server.

A developer in charge of or integrating a control program development for the entire real machine of the autonomous operation apparatus 100 receives control programs of the main body 110 and the respective modules 120 via the network. More specifically, a real machine program development computer used by the developer of the entire real machine receives respective control programs by direct communication with a sharing storage or a developer storage on a cloud server, a dedicated server, or module development computers of the respective developers. Note that the network receiving the provided control programs may be constituted by either a wired or wireless network.

The real machine program development computer used by the developer of the entire real machine corresponds to the development apparatus 200 depicted in FIG. 1, and has a function of performing calculation using a physics engine on a development tool program, and displaying an operation of a virtual machine corresponding to the real machine using 3D graphics animation. Accordingly, the real machine program development computer is capable of checking and verifying operations of control programs of the main body 110 and all the modules 120 through display by 3D graphics animation by the virtual machine or the like using the physics engine function of the development tool program.

Moreover, respective control programs are correctable on the real machine program development computer in parallel to execution of developed control programs. Accordingly, the developer of the entire real machine 100 and the developers in charge of the respective modules 120 collaboratively and efficiently develop control programs of the real machine 100. Moreover, each of the control programs corrected on the real machine program development computer is again supplied to the developer in charge of the corresponding module, so that it is possible to cause the corresponding developer to complete a final program product. For example, control programs are managed in units of the module 120 by using dedicated storages of the main body 110 and the respective modules 120 disposed on a cloud server, and accordingly, it is possible to smoothly advance collaborative development.

A control program after operation check and verification of the real machine program development computer used by the developer of the entire real machine 100 (i.e., after completion) can be directly uploaded from the development apparatus 200 to the real machine of the autonomous operation apparatus 100 via the USB port 214. Alternatively, a control program for each of the entire real machine 100 or the modules 120 can be uploaded to the real machine 100 via a wired or wireless network.

In addition, a mode which uploads a control program from a dedicated server to the real machine 100 is assumable. For example, a user of the certain real machine 100 may log in to a dedicated server via a user interface (e.g., keyboard, mouse, and touch panel) of a user terminal of the user using an account of the user, and further select a control program to be downloaded or uploaded to or from the real machine 100 to carry out downloading or uploading.

Figure 3:
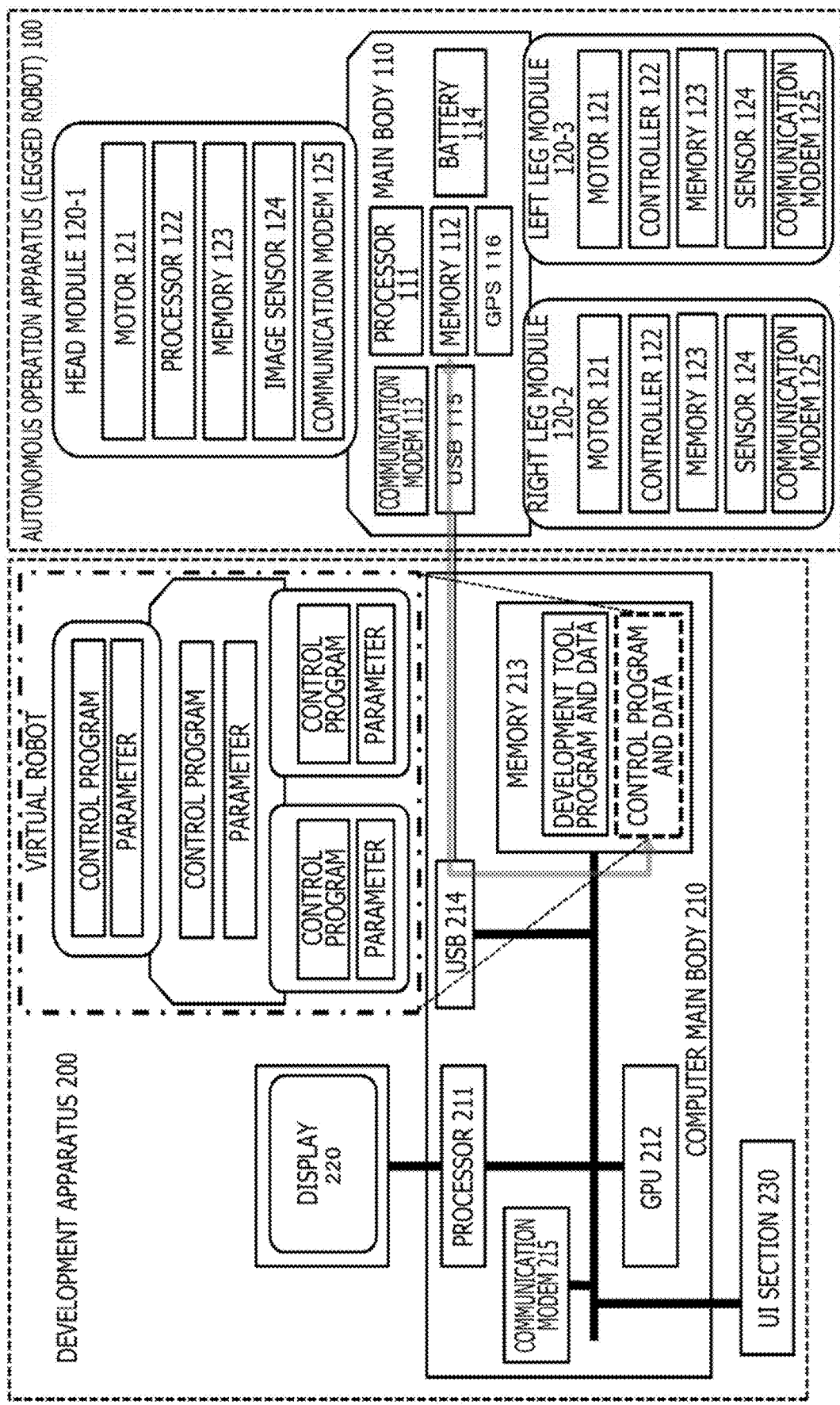
FIG. 3 is a diagram depicting an example of a development environment of a control program for a robot corresponding to a development target.

FIG. 3 depicts an example of a development environment of a control program of a legged robot corresponding to a development target, as a specific example of the autonomous operation apparatus 100. In the example in FIG. 3, development of programs is carried out by using the single development apparatus 200. Needless to say, a distributed development environment provided via a network as depicted in FIG. 2 can be also used.

The legged robot 100 includes a main body 110, and modules 120 corresponding to a head, and left and right legs. A data bus and a control bus are present to connect the main body 110 and hardware such as the respective modules 120 including the head and the left and right legs. The data bus and the control bus are not depicted in the figure.

Note that the legged robot 100 may further include a not-depicted module such as an upper limb. In addition, adoptable is such a modified example of the real machine configuration where functions such as a processor and a memory in at least some of the modules are integrated with the main body and controlled by the processor of the main body.

The main body includes a processor, a memory, a wireless or wired communication modem, a battery, a USB port, and a GPS.

Each of modules 120-2 and 120-3 corresponding to the left and right legs includes a motor 121 as an actuator for driving joints such as a hip joint, a knee joint, and an ankle (or for walking), and a motor controller 122 as a processor for controlling driving of the motor. There is further provided a sensor 124 including a torque sensor for detecting an external force generated on an output side of the motor, an encoder for detecting a rotation angle on the output side of the motor, a ground contact sensor at a sole, and other sensors. In addition, a module 120-1 at the head includes a motor 121 as an actuator for rotating the head, and an image sensor 124 as a sensor for imaging surroundings.

Similarly to the case in FIG. 1, control programs of the main body 110 and the respective modules 120 of the legged robot 100 described above can be created using a development tool program operating on the development apparatus 200. Moreover, operation check and verification can be achieved through display of 3D graphics animation of the virtual machine using calculation by a physics engine operating on the development tool program.

Furthermore, a control program created using the development apparatus 200, or a control program of the entire real machine 100 and a control program of each of the modules 120 developed in the development environment depicted in FIG. 2 (or other development environment) are uploaded into the memory 112 of the main body 110 or the memory 123 of each of the modules 120 by wired or wireless communication via the USB port 115 of the main body 110 or the communication modem 125 of each of the modules 120. Thereafter, the uploaded program is appropriately operated at a start of the legged robot 100 or on other occasions.

Figure 4:
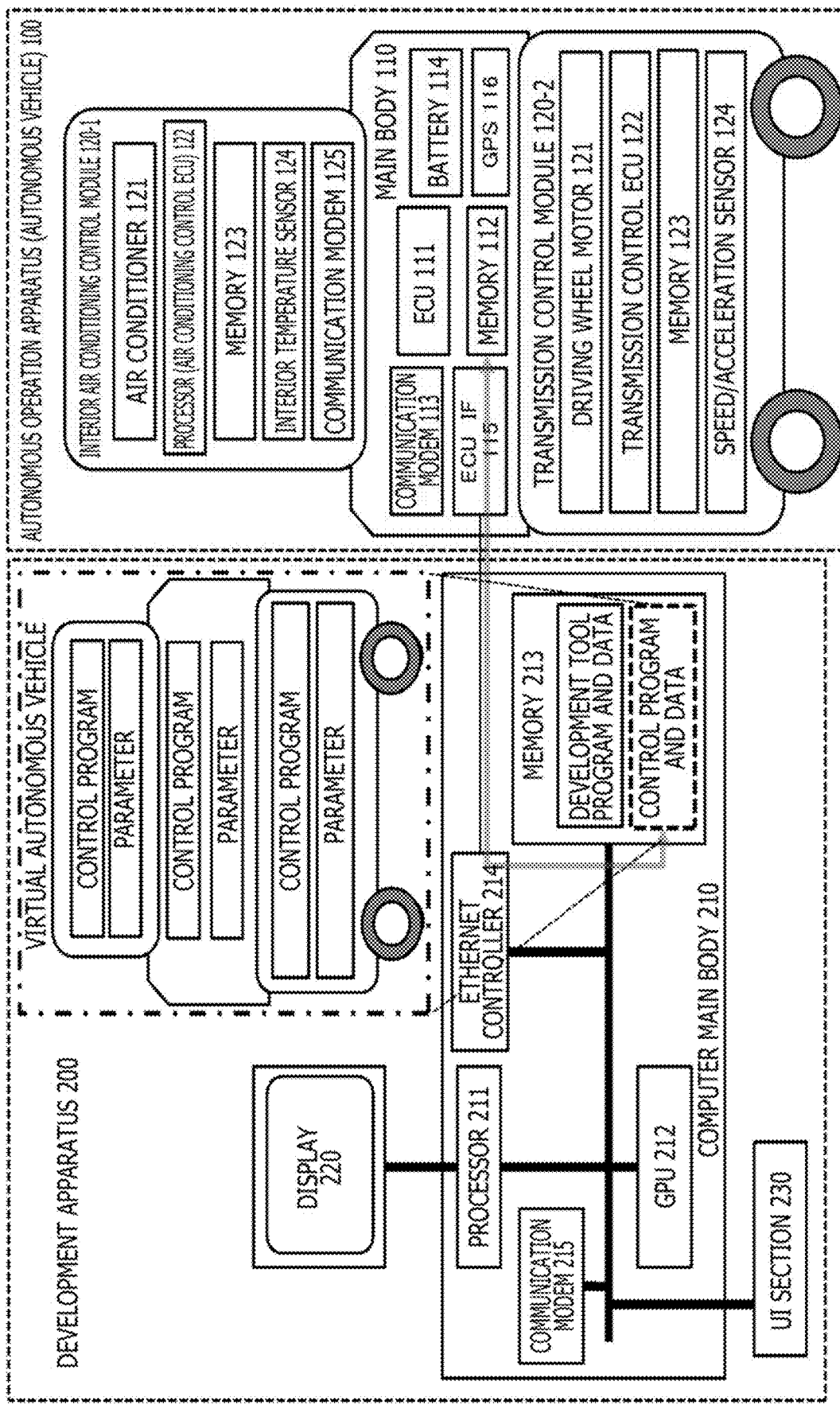
FIG. 4 is a diagram depicting an example of a development environment of a control program for an autonomous vehicle corresponding to a development target.

FIG. 4 depicts an example of a development environment of a control program of an autonomous vehicle corresponding to a development target, as another specific example of the autonomous operation apparatus 100. The autonomous vehicle 100 is a vehicle to which an autonomous driving technology has been introduced (or unmanned driving vehicle for work or transportation). Examples of the autonomous vehicle 100 include a full-autonomous vehicle, and a vehicle traveling in an automatic driving mode switchably selected between the autonomous driving mode and a manual driving mode. In FIG. 4, development of programs is carried out using the single development apparatus 200. Needless to say, a distributed development environment via a network as depicted in FIG. 2 can be also used.

The autonomous vehicle 100 depicted in FIG. 4 includes a main control unit 110, a transmission control module 120-2, and an interior air conditioning control module 120-1 as a module. Note that a data bus and a control bus (e.g., CAN bus) are present to connect a main control unit 110 and hardware such as respective modules 120. The data bus and the control bus are not depicted in the figure. In addition, the autonomous vehicle 100 generally includes a large number of modules not depicted as well as the transmission control module 120-2 and the interior air conditioning control module 120-1. These modules are not described herein for simplification.

The main control unit 110 includes an ECU (Electronic Control Unit) 111 as a processor, a memory 112, a communication modem 113, an ECU interface 115, a GPS 116, and a battery 114. The communication modem 113 assumed herein is Wi-Fi (Wireless Fidelity), LTE (Long Term Evolution), or short-range wireless communication, for example. In addition, the ECU interface 115 assumed herein is an interface for a CAN (Controller Area Network) bus (not depicted), and is connected to the development apparatus 200 side using a communication. standards such as Ethernet (registered trademark).

The interior air conditioning module 120-1 includes an air conditioner 121 as an actuator, an air conditioning control ECU 122 as a processor, a memory 123, an interior temperature sensor 124 as a sensor, and a communication modem 125 such as Bluetooth (registered trademark) communication. For example, it is assumed that air conditioning is controlled via connection with an information terminal (not depicted) such as a smartphone carried by an occupant via Bluetooth (registered trademark) communication.

The transmission control module 120-2 includes a driving wheel motor 121 as an actuator, a transmission control ECU 122 as a processor, a memory 123, a speed/acceleration sensor 124 or a steering angle sensor as a sensor, and others.

Note that the ECU 111 in the main control unit 110 may be configured to perform central management of all the modules 120 instead of the ECUs included in the main control unit 110 and the respective modules 120 as in the configuration example depicted in FIG. 4.

Similarly to the case in FIG. 1, control programs of the main control unit 110, the interior air conditioning control module 120-1, and the transmission control module 120-2 of the autonomous vehicle 100 described above can be created using a development tool program operating on the development apparatus 200. Moreover, operation check and verification can be achieved through display by 3D graphics animation of a virtual machine using a physics engine function operating on the development tool program.

Furthermore, a control program created using the development apparatus 200, or a control program of the entire real machine 100 and a control program of each of the modules 120 developed in the development environment depicted in FIG. 2 (or other development environment) are uploaded into the memory 112 of the main control unit 110 or the memory 123 of each of the modules 120 by wired or wireless communication via the ECU interface 115 of the main control unit 110 or the communication modem of each of the modules 120. Thereafter, the uploaded program is appropriately operated at a start of the autonomous vehicle 100 or on other occasions.

FIG. 5 depicts an example of a development environment of a control program of an unmanned aerial vehicle (drone) corresponding to a development target, as a further specific example of the autonomous operation apparatus 100. In the example in FIG. 5, development of programs using the single development apparatus. Needless to say, a distributed development environment provided via a network as depicted in FIG. 2 can be also used.

The unmanned aerial vehicle 100 depicted in FIG. 5 includes a main control unit 110, and a camera control module 120-1 and a propeller control module 120-2 as modules. A data bus and a control bus are present to connect the main control unit 110 and hardware such as the respective modules 120. The data bus and the control bus are not depicted in the figure. The wireless aerial vehicle 100 may further include modules other than the camera control module 120-1 and the propeller control module 120-2.

The main control unit 110 includes a processor 111, a memory 112, a communication modem 113, a USB port 115, a GPS 116, and a battery 114. The communication modem 113 assumed herein is a wireless modem such as Wi-Fi, LTE, and near field communication to communicate with a remote controller (not depicted) operated by an operator. In addition, connection with the development apparatus 200 side is achieved using the USB port 115 to upload a developed control program.

The camera control module 120-1 includes a camera unit (including image sensor) 124 as a sensor, a camera unit rotation motor 121 as an actuator, a motor controller 122 as a processor, a memory 123, and a communication modem 125. The camera unit rotation motor 121 is rotatable in a range of 360 degrees in a horizontal direction, for example, and further may be tilt-rotatable. In addition, the communication modem 125 assumed herein is a wireless modem such as Wi-Fi, LTE, and near field communication to achieve rotation or imaging by the camera unit 124 in accordance with a command issued from a remote controller or a smartphone (not depicted) operated by the operator.

The propeller control module 120-2 includes three propellers (including motor for rotation) 121 as an actuator, a processor 122 for controlling the motor for rotation of the propeller 121, a memory 123, and a propeller rotation detection sensor 124 as a sensor, for example.

Similarly to the case in FIG. 1, control programs of the main control unit 110, the camera control module 120-1, and the propeller control module 120-2 of the unmanned aerial vehicle 100 described above can be created using a development tool program operating on the development apparatus 200. Moreover, operation check and verification can be achieved through display by 3D graphics animation of a virtual machine using a physics engine function operating on the development tool program.

Furthermore, a control program created using the development apparatus 200, or a control program of the entire real machine 100 and a control program of each of the modules 120 developed in the development environment depicted in FIG. 2 (or other development environment) are uploaded into the memory 112 of the main control unit 110 or the memory 123 of each of the modules 120 by wired or wireless communication via the communication modem of the main control unit 110 or each of the modules 120. Thereafter, the uploaded program is appropriately operated at a start of the unmanned aerial vehicle 100 or on other occasions.

Figure 6:
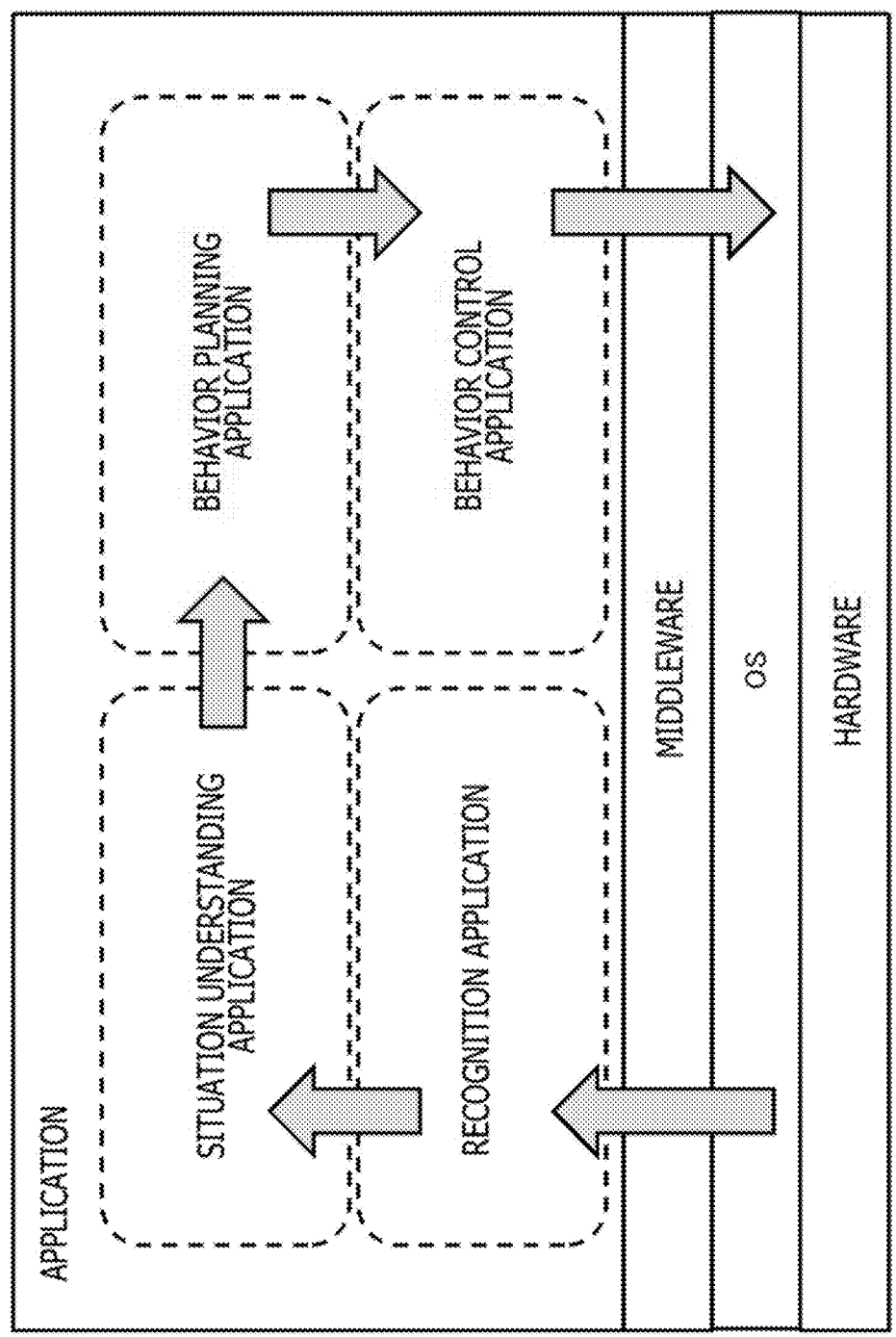
FIG. 6 is a diagram depicting a configuration example of an architecture of hardware and software mounted on a real machine of an autonomous operation apparatus 100.

FIG. 6 depicts a configuration example of an architecture of hardware and software mounted on the real machine of the autonomous operation apparatus 100.

Hardware in a lowermost layer includes a plurality of hardware modules such as the main body (or main control unit 110 and the plurality of modules 120 incorporated in a housing of the real machine 100. In addition, there may be present also a real machine including respective hardware modules distributed into two or more housings.

The OS directly controls the respective hardware modules. Note that there may be also a case where not the OS but a control program uploaded into the memory 123 in each of the modules 120 directly controls the hardware modules (more specifically, the processor 122 executes the control program to control driving of the actuator 121).

As depicted in FIG. 1 and other figures, the autonomous operation apparatus 100 which includes the main body 110 and the plurality of modules 120 both constituting a hardware architecture is configured such that the main OS controlling the entire system 100 in (the processor 111 of) the main body 110 operates to directly or indirectly control the control program currently being executed in each of the modules 120.

A developer of the application program can develop an application program using the API provided by the system (e.g., middleware). In addition, the developer of the application program can develop an application program including a program which issues an instruction to the OS using a system call. The system call referred to herein is an interface for using functions associated with system control. For example, the system call is used at the time of a change of parameters of the processor (e.g., motor controller) in the module, or setting a network address in the communication modem.

It is assumed that a large number of application programs classified into "recognition," "situation understanding," "behavior planning," and "behavior control" operates on the autonomous operation apparatus 100 such as a robot, an autonomous vehicle, and an unmanned aerial vehicle.

The "recognition" application program is an application program which performs processing for recognition of sensor information obtained by a camera or other sensors included in a hardware layer. The "situation understanding" application program is an application program which understands a current situation of the real machine on the basis of a recognition result obtained by the "recognition" application program. For example, an image analysis application program analyzing an image captured by the camera is an example of the "situation understanding" application program. Note that an application program operating under an execution environment provided by the OS is managed in the memory as a "process" (or a "thread"), and executed by the processor (e.g., CPU).

The "behavior planning" application program is an application program which plans a behavior of the real machine in accordance with the current situation of the real machine to be understood by the "situation understanding" application program. For example, a route selection application program which selects a shift route of the real machine in accordance with a result obtained by analyzing an image of surroundings of the real machine using the above image analysis application program is an example of the "behavior planning" application program.

In addition, the "behavior control" application program is an application program which controls a behavior or operation of hardware for implementing behavior planning proposed by the "behavior planning" application program. Examples of the "behavior control" application program include an application program which controls a traveling direction and a traveling speed of the real machine in accordance with a route sequentially selected by a route selection application program, and an application program which controls driving of a leg of a robot, a driving wheel of an autonomous vehicle, and a propeller of a drone in accordance with the traveling direction and the traveling speed.

Data communication between application programs or processes classified into "recognition," "situation understanding," "behavior planning," and "behavior control" is required at the time of implementation of a behavior or operation on the autonomous operation apparatus 100 such as a robot, an autonomous vehicle, and an unmanned aerial vehicle.

Meanwhile, all of the large number of application programs operating on the autonomous operation apparatus 100 are difficult to develop by only a developer of the apparatus, or a single software vendor commissioned by the developer. In reality, at least some of the application programs are provided by a third party. It is further assumed that the large number of application programs are developed in a distributed development environment as depicted in FIG. 2. For example, in a case where an application program developed for an autonomous vehicle is roughly divided into two types, i.e., an application program requiring high reliability, such as driving system control (e.g., DSU, and a highly versatile application program provided for convenience of users, such as infotainment associated with services for users (e.g., audio instrument and Internet connection service) and vehicle interior environment control (e.g., air conditioning control), the former type application program may be developed in-house, while the latter application program may be provided by a third party.

However, when the application program provided by the third party outputs erroneous data produced intentionally or erroneously by the third party in a series of flow of "recognition," "situation understanding," "behavior planning," and "behavior control," failure may be produced in the entire system.

Accordingly, proposed in the present specification hereinafter is a technology which introduces a grouping method called a container method into a system using a publisher/subscriber type asynchronous communication model, and limits communication to component units (e.g., application programs) belonging to containers, or to containers to which software included in component units belong. According to this technology, any grouping of component units or software included in component units is achievable while maintaining independence of component unit development.

In addition, proposed in the present specification hereinafter is a technology which processes information received from an identical source in accordance with characteristics allocated to each component unit (e.g., degrading information in accordance with a security level of each component unit) before transmitting the information.

Moreover, proposed in the present specification hereinafter is a technology which detects malfunction caused by software included in an updated or added component unit during system operation, and switches operation to operation of software whose operation has been guaranteed before update or addition of the software causing malfunction while continuing the system operation.

Furthermore, proposed in the present specification hereinafter is a technology which safely updates or adds a component unit or software included in a component unit by temporarily storing transmission and reception data associated with a component unit currently being updated, and restarting connection to data starting from the transmission and reception data temporarily stored after update.

Furthermore, proposed in the present specification hereinafter is a technology which achieves limitation of a data volume transmitted or received by a component unit at a physical level (packet volume) and a logical level (the number of topics used for publisher/subscriber communication), and uniformly distributes network resources to respective multi-tenants (in a case in which component units are provided for plural vendors).

According to a publisher/subscriber type communication model applied in the present embodiment, a transmission side client (producer) which creates and transmits a message is referred to as a publisher, while a message reception side client (consumer) is referred to as a subscriber. The publisher does not consider who is a destination of transmission, but only issues a message to a server (publish). Meanwhile, the subscriber issues a request for subscription of the message to the server (subscribe). Thereafter, the message is distributed to the subscriber demanding the message with reference to a type and an attribute of the message transmitted from the publisher. The publisher and the subscriber need not be conscious of each other. In addition, the subscriber is capable of receiving only the message required by the subscriber.

Moreover, a mode which performs asynchronous communication designating a named logic channel called a "topic" can be also referred to as a topic-based publisher/subscriber type communication. The message transmitted from the publisher is registered in a transmission destination called a topic in a server (master). Thereafter, the server matches a topic given to the message transmitted by the publisher with a topic received and registered by the subscriber, and distributes the topic to the subscriber requesting distribution of the topic (i.e., subscribing the topic). Note that a message received from one or a plurality of publishers can be registered in one topic. In addition, one or a plurality of subscribers can register an identical topic. The subscriber can receive messages of a plurality of publishers from the registered topic. A plurality of subscribers having registered an identical topic can receive an identical message from the topic.

Respective terms "container," "node," "proxy," "master," and "topic" used in the present specification are herein described.

Container:

A container is an address or a name space logically separated by a virtual NIC (Network Interface Card), or a name space physically separated by each NIC or the like. The container can be considered as a system management area separated as a network segment. The container is divided into two types, i.e., a "container host" and a "container guest." The container host is a space where only a reliable host node operates. Meanwhile, the container guest is a space where only a guest node needed to be separated from the host node operates. For example, an application program or a library program provided by a third party needs to be separated from the host node, and is operated in the container guest ("application program" and "library program" are hereinafter abbreviated as "application" and "library," respectively). In addition, an application or a library whose reliability has not been secured by operation guarantee or authentication needs to be separated from the host node, and is operated in the container guest. Note that the term "separation" used in the present specification chiefly refers to a state that two entities are present independently from each other. It is assumed that a term "isolation" also used herein is included in the meaning of "separation."

Node:

A node corresponds to an application, or a process where an application operates in a container (program codes are hereinafter referred to as an "application," while a process executed by the processor of the system is hereinafter referred to as a "node"). A node designates a named logic channel called "topic," and transmits a subscribing demand or a publishing demand for the topic to a master of a container to which the node belongs. Thereafter, in a case where a connectable partner is found (more specifically, in a case where matching with the desired connection partner is established in the master), unidirectional communication using publisher/subscriber type messaging and RPC (Remote Procedure Call) is achievable by acquiring ID information concerning a communication partner (e.g, process ID). The node (application) publishes, as the API, information concerning an application name, a topic name provided by the application, or which of subscribing data and publishing data is to be performed by the application for a developer of a new application.

The node can be classified into a "host node" and a "guest node." The host node is a process where a reliable application or library operates in a container host. Meanwhile, the guest node is a process where an application or a library provided by a third party, an application or a library whose reliability has not been secured, or the like operates in a container guest. In following description of processing flows and the like, the term "container host" is also used instead of the "host node," and the term "container guest" is also used instead of the "guest node." In this case, note that the "host node" and the "guest node" perform communication process or the like as a part of the "container host" and the "container guest" to which the "host node" and the "guest node" belong, respectively.

Proxy:

A proxy (proxy node) manages a mapping table containing following items (a) to (d). A basic function of the proxy is similar to the basic function of the node. However, the proxy designates as address of a container quest and communicates with the container quest via a network in the case of communication with a master of the container guest.

(a) a topic identifier capable of designating a node (subscribing a node, publishing (advertising) a node) in a container host (b) a topic identifier capable of designating a node (subscribing a node, publishing (advertising) a node) in a container guest (c) an address of a container guest (e.g., an IP address (URI (URL) allowable as a general example)

(d) an authentication state (verification) and security level of a container guest, data transmitted and received during a program update process of a subscriber Master:

A master receives a subscribing demand and a publishing demand from a node in a container, and manages a correspondence between nodes (i.e., a correspondence between a subscribing node and a publishing (advertising) node for each topic. In addition, in a case where the subscribing node and the publishing (advertising) node match each other concerning an identical topic, the master notifies the respective nodes (at least a publishing (advertising) node on the transmission side) about an ID (e.g., a process ID, a program name, a transmission destination (e.g., an IP address, a port) of the communication partner (a subscribing node on the reception side) to start a publisher/subscriber type messaging and an RPC between nodes (e.g., between a node and a proxy).

The master can be classified into a "host master" and a "guest master." The host master is a master operating in a container host, while the guest master is a master operating in a container guest.

Topic:

A topic is a following name or identifier (ID) used for creating a data communication route having a common named logic channel at a node which subscribes or publishes (advertises) a message. A container guest name herein is created at the time of registration of a guest application.

topic name (ID)="/"+named logic channel name topic name for container guest="/"+container guest name+"/" named logic channel name Use of Container as Application Operation Environment Described next is a case where a container is used as an application operation environment.

A developer having developed a new application aimed at a certain autonomous operation apparatus 100 (e.g., a robot, an autonomous vehicle, an unmanned aerial vehicle (drone)) and operating on the autonomous operation apparatus 100 with other applications registers the developed application in a server. Thereafter, the developer is allowed to install the developed application in an isolated space called a container constituted by an address or a name space logically separated from the outside, and operate the developed application on the autonomous operation apparatus 100.

The application installed in the container operates as a process called a node. As described above, the container is classified into the container host and the container guest.

The container host is provided as a space where only a reliable host node operates. For example, an application meeting predetermined conditions presented below is installed in the container host, and operates as a host node.

an application developed by the developer of the main body of the autonomous operation apparatus 100 an application at a certain security level or higher an application whose operation has been verified Also, the container guest is provided as a space where a guest node required to be separated from a host node operates. For example, an application not meeting the foregoing predetermined conditions required for a host node, but grouped into a predetermined unit defined in a manner presented below, for example, is installed in a container guest, and operates as a guest node while separated from a host node (independently from a container host). The grouping method using containers achieves independence in application development.

a group in units of commissioning software manufacturer a group in units of application manufactured by a third party a group at certain security level or lower a group of application whose operation has not been verified Applications meeting the above predetermined conditions are installed in a container host and each operate as a host node to implement organized group communication between nodes. More specifically, data transmission and reception utilizing the mechanism of publisher/subscriber type communication is achieved between nodes in the container host. As described above, a node is allowed to communicate with another node via a process called a master in the publisher/subscriber type communication. In this case, a predetermined topic name can be designated as a communication route for communication between the nodes. Communication designating a topic name corresponds to communication using a named communication path.

Figure 7:
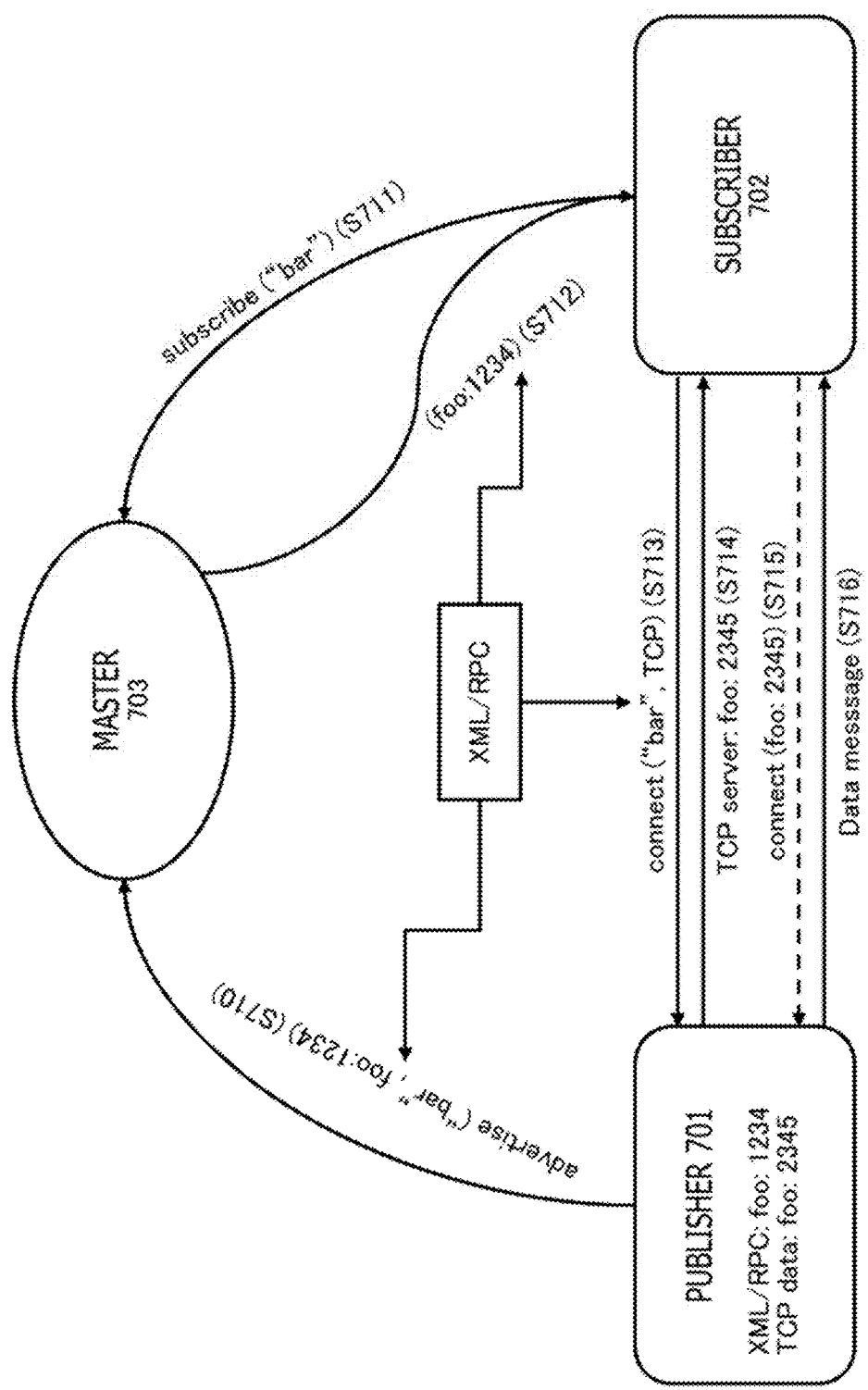
FIG. 7 is a diagram for explaining a mechanism of publisher/subscriber type communication.

A data transmission and reception method utilizing the mechanism of the publisher/subscriber type communication is described with reference to FIG. 7. In this figure, respective nodes corresponding to a publisher 701 and a subscriber 702, and a master 703 operate in a container host 700.

Initially, the publisher 701 as an advertiser on the transmission side registers, in the master 703, a topic name "bar," and information "foo: 1234" constituted by a combination of a host name (foo) and a port number ((1234) as an ID of the publisher 701 (S710).

In addition, the subscriber 702 as a subscriber on the reception side demands the master 703 to issue information (XML/RPC URI) associated with a distribution source of a topic "bar" (S711).

The master 703 notifies the subscriber 702 about "foo: 1234" as information associated with the publisher 701 as the distribution source in a state that the subscribing node and the publishing node match each other concerning the topic "bar" (S712).

The subscriber 702 having received the notification from the master 703 transmits, to the publisher 701, a subscription request (connect ("bar," TCP)) of the topic name "bar" via TCP socket communication (S713).

In response to this request, the publisher 701 issues notification about URI (foo: 2345) of a subscription TCP server (S714).

Thereafter, the subscriber 702 demands the subscription TCP server to make connection for subscription of the topic name "bar" (connect (foo: 2345)) (S715).

In response to this demand, distribution of the topic with the topic name "bar" is achieved by TCP/IP from the subscription TCP server (foo: 2345) to the subscriber 702 (S716).

Note that the topic distribution requires communication with the master 703 to share a name space of the topic with the master 703, and P2P communication between the nodes (i.e., publisher 701 and subscriber 702) for actual data transmission and reception.

For example, suppose that a first node having a function of providing data, and a second node performing processing by using the data operate in a container host. More specifically, the first node is an application providing an image captured by a camera, while the second node is an application creating a three-dimensional map.

The first node designates a topic name "image" for a master, and transmits a demand for data transmission (publishing or advertising). In contrast, the second node designates a topic name "image" for the master, and transmits a demand for data reception (subscribing). Either the publishing (or advertising) demand or the subscribing demand may be transmitted first, or both of these demands may be simultaneously transmitted.

The master notifies the first node corresponding to the publishing node of an ID (or name or transmission destination information) of the second node corresponding to the subscribing node, and notifies the second node corresponding to the subscribing node of an ID (or name or transmission destination information) of the first node corresponding to the publishing node in a state that the subscribing node and the publishing (advertising) node match each other concerning the identical topic name "image." In this manner, transmission and reception of data associated with the topic name "image" is achievable between the first node and the second node.

The topic name such as "image" performs a function of a communication interface for respective applications (or host nodes operating in a container host) to be installed in the system. A developer developing a new application is allowed to easily develop an application assumed to provide data for other applications, and an application which performs processing using data received from other applications by defining an associated topic name for each application and disclosing the topic name to developers as what is called interface information as presented in Table 1 below.

TABLE 1

| APPLICATION NAME | PUBLISHER (DATA TRANSMISSION) TOPIC NAME | SUBSCRIBER (DATA RECEPTION) TOPIC NAME |
|---|---|---|
| CAMERA IMAGE APPLICATION | IMAGE | NONE |
| ACCELERATION SENSOR APPLICATION | ACCELERATION | NONE |
| 3D MAP GENERATION APPLICATION | NONE | IMAGE, ACCELERATION |

For example, information as in Table 1 presented above can be managed in a database associated with a development tool program for developers. This database may be stored and managed in a storage managed by a computer where the development tool program operates (e.g., development apparatus 200 in FIG. 1), or may be stored and managed in a computer or a storage associated with a server present in a network as depicted in FIG. 2. The development tool program can display an associated topic name to a user developing an application by selecting an application name.

An application program can be efficiently developed by managing a topic name used by the application is a database associated with the development tool program.

By way of example, suppose that a following character string is input on a program edit screen in a program development environment by a program developer through a keyboard (note that a closing parenthesis ")" is intentionally removed from description to indicate a state in the middle of input of the program).

Register_Image ("Camera Image Application"

The development tool program manages information presented in Table 1 in a database. The development tool program herein can recognize a registration application name of a database, and highlight a character string "camera image application" by underline, coloring, inversion, or other methods, for example, when an application name "camera image application" is input on the program edit screen.

In this case, in response to a click (selection) operation for selecting the highlighted character string "camera image application" by a user using a pointing device such as a mouse, information associated with the application name such as "publisher (data transmission) topic name: image" is displayed at a position near the character string "camera image application." When the user further selects a position of indication of the topic name "image" again using the pointing device such as a mouse, following input is achieved by a function of auto-completion. Accordingly, development efficiency improves.

Register_Image ("Camera Image Application," "Image"

Registration of Application by Developer

Next described is an application pre-registration request issued from a new application developer for registration in a container guest, for example.

For issuing an application pre-registration request, a registration request form containing description of predetermined items initially needs to be transmitted to a registration request processing server to complete registration. At least a new application name and a host application name need to be written in the registration request form. Examples of further information to be registered by the request include an application developer name (manufacturer name), authentication information issued by a third-party organization, a security level, and function description of a developed application. However, the information to be registered is not limited to these items of information.

Subsequently, a registration request of a developed application is issued to the application request server. In the description of the present embodiment, it is assumed that a process called "proxy manager" operating on the server performs a reception process for receiving this application request. When the request is received by the proxy manager, a new container name (new container quest name) and a published topic name are allocated to the new application, and registered in a database associated with the proxy manager together with other registration information. The topic name allocated at the time of request acceptance can be used for data transmission and reception between nodes each corresponding to an application in the container host and an application operating in the container guest, and nodes corresponding to other applications. Following Table 2 is an example of information allocated to the new application and registered in the database.

TABLE 2

| REGISTRATION APPLICATION NAME | IMAGE RECOGNITION APPLICATION |
|---|---|
| CONTAINER NAME | PROXY A |

TABLE 2-continued

| HOST APPLICATION NAME | CAMERA IMAGE APPLICATION |
|---|---|
| PUBLISHER (DATA TRANSMISSION) TOPIC NAME | IMAGE |
| SUBSCRIBER (DATA RECEPTION) TOPIC NAME | RECOGNITION RESULT |

The container name is not limited to a container name allocated by the proxy manager at the time of the application request as in the embodiment, but may be a container name allocated beforehand. For example, a developer (manufacturer) may be registered beforehand prior to development of the application to allocate a container name to a registered developer name (manufacturer name) beforehand. In a case where a container name is allocated beforehand, the container name allocated beforehand may be written in the request form at the time of the above application request to manage the container name in a database associated with the proxy manager together with the newly registered application.

The application developer can generate codes of an application program operating in a predetermined container guest of the system by constructing an application program already developed together with registered information (see Table 2), and replacing "[registration topic name]" contained in source codes of the application with "[container name]/[registration topic name]." Note that the example described above is a case where information associated with an application name is displayed at a position near an input character string during input of the character string on a program edit screen through the keyboard in a program development environment for the purpose of development assistance. However, this development assistance is also achievable by allowing supply of information contained in a database including registration of registration request information as presented in Table 2 to the program development environment.

For example, an application program subjected to registration request as depicted in FIG. 8 contains a following code in the eighth line of source codes.

[Math. 1]

ros::Publisher chatter_pub= n. advertise<std_msgs::String>("[registered topic name]", 1000);

In this case, "advertise" is a procedure of a program where this code demands data transmission from a different node while designating a topic of "[registration topic name]" as a node performing data transmission. The application depicted in FIG. 8 is a process corresponding to an application which includes registration of information presented in Table 2. In the case of operation as a guest node in a container guest, the command in the eighth line indicates that the corresponding node performs publishing (data transmission).

In this case, the other node is a subscriber (data reception). Accordingly, "recognition result" corresponding to an item of a "subscriber (data reception) topic name in the registration information presented in Table 2 is programmed as "[registration topic name]." The source codes of the program are therefore edited and constructed using the registration information presented in Table 2 to change the code in the eighth line in a following manner (rewrite "[registration topic name]" to "/proxy A/recognition result)," and generate program codes.

[Math. 2]

ros::Publisher chatter_pub= n. advertise<std_msgs::String>("/proxy A/recognition result", 1000);

In this manner, the topic registered in the proxy manager can be easily inserted into the source codes of the application program newly registered. More specifically, the user (developer of the application) can construct an application program operating in the container guest on the basis of the registration request information without considering a list of the registration request information.

First Embodiment

A grouping method called a container method is introduced in a system using a publisher/subscriber type asynchronous communication model to operate an application not meeting a predetermined condition separately from a host node operating in a container host. In this manner, failure in the entire system is avoidable by isolation of erroneous data output from an application program provided by a third party (not meeting the predetermined condition) by intention or error of the third party.

Starting Process for Container Guest and Proxy

In a booting process of the system (or OS), a container host read from the memory is set for the system, and an application meeting the predetermined conditions (described above) is installed in the container host and operates as a host node. In other words, only a container host is set as a space where a reliable host node operates in an initial state of the system.

For operating an application not meeting the predetermined conditions separately from the host node operating is the container host, a container guest needs to be started as a space where this application is installed.

The container guest is started by a management process having a function of an application launcher. The application launcher also manages container virtual network management, such as allocation of an IP address to a started container guest. It is actually a proxy manager which sets a value of an IP address for a virtual NIC of a container. However, management of IP addresses allocated to respective container quests (process similar to process of DHCP server) is performed by the application launcher.

Figure 9:
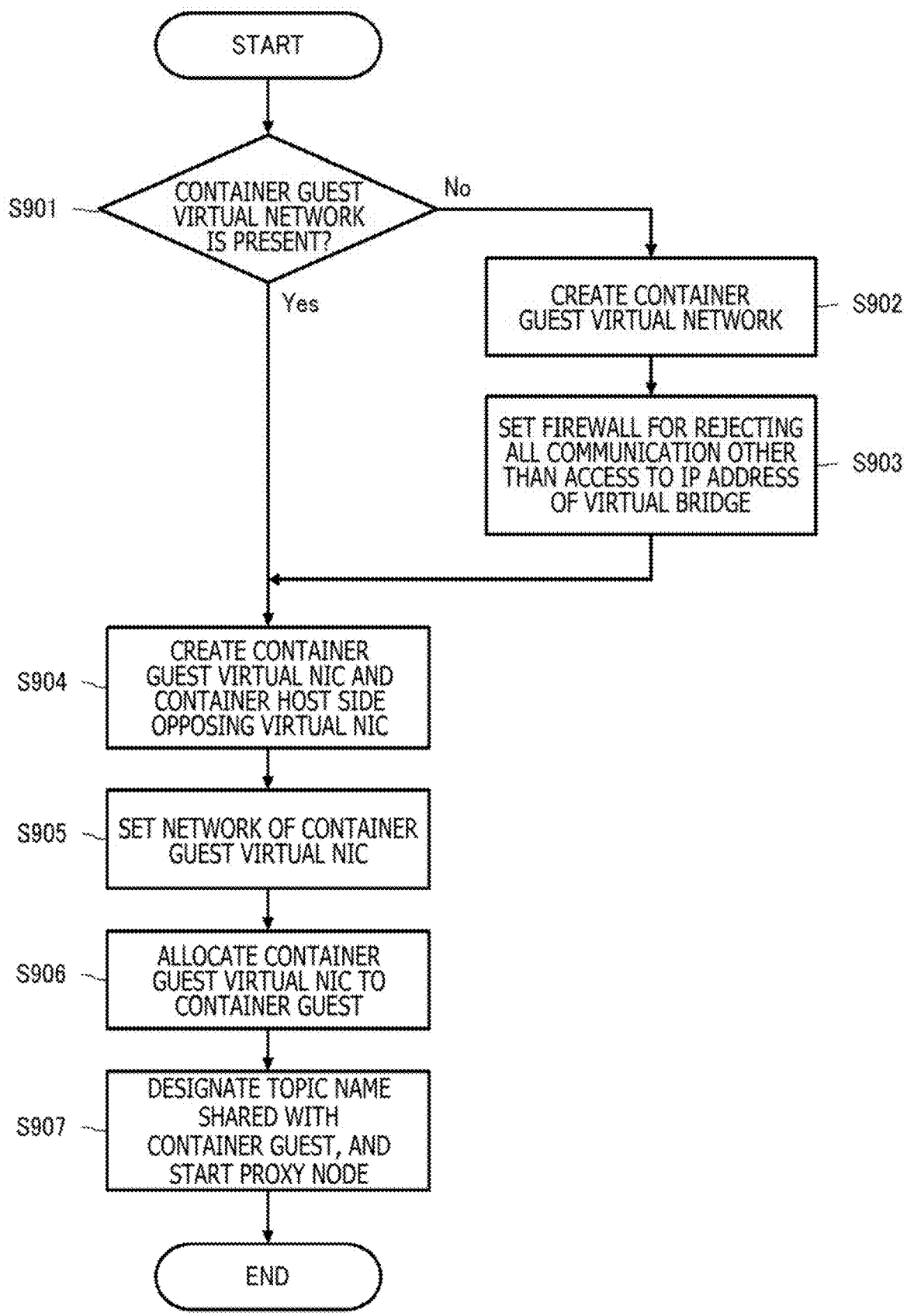
FIG. 9 is a flowchart representing a processing procedure for starting a container guest.

FIG. 9 depicts a processing procedure for starting a container guest in the form of a flowchart. It is assumed herein that one or more host nodes have been started in a container host after completion of setting of the container host, and that a proxy manager has been started.

In response to issue of a demand for starting a container guest from a user (e.g., developer of the application), the application launcher initially checks whether a container guest virtual network has been created (step S901).

In a case where a container guest network has not been created yet without reading of any container guest (No in step S901), a container guest virtual network is created (step S902) by following processes S902-1 to S902-2.

S902-1) Create a virtual bridge (brctl addr command).

S902-2) Set a network such as an IP address for the virtual bridge (ip addr command).

Subsequently, firewall for rejecting all communications other than an access to the IP address of the virtual bridge is set for the virtual bridge (iptables command) (step S903). Processing in steps S902 and S903 disables direct communication between the container guest and a different container (e.g., a container host and a different container guest).

In a case where the container guest virtual network has been already created (Yes in step S901), or after a container guest virtual network is created by processes in steps S902 and S903 described above in a state that no container guest virtual network has been created (No in step S901), a container guest virtual NIC is created. In addition, a virtual NIC opposing the container guest virtual NIC is created on the container host side (step S904). For example, the IP address of the container guest virtual NIC is set to 192. 168. 91. 0/24, while the IP address of the opposing virtual NIC on the container host side is set to 172. 16. 10. 0/16.

Subsequently, a network of the container guest virtual NIC is set (step S905) by following processes S905-1 to S905-6.

S905-1) Create a container guest virtual NIC and a container host side opposing virtual NIC (ip link command).

S905-2) Start the container host side opposing virtual NIC (ip link command).

S905-3) Allocate the container host side opposing virtual NIC to the virtual bridge (ip link command).

S905-4) Add a symbolic link to ip netns command operation directory of a network name management file in an initial process of the container guest to directly operate the network name management file of the container guest (In -s/proc/[container guest initial process ID]/ns/net/var/run/netns/[container guest initial process ID]). Note that this process completes allocation of the virtual NIC to the container quest.

S905-5) Allocate a virtual bridge to the symbolic link created in S905-4 described above (ip link command).

S905-6) Set a network for the symbolic link created in S905-4 described above (ip netns command).

Thereafter, the container guest virtual NIC is allocated to the container guest (step S906). A topic name shared between the container host and the container quest is designated. A proxy node is started (step S907) to end this process.

The proxy manager designates an argument for a program of the proxy node to start the proxy node. The argument designated herein is an ID for uniquely identifying the proxy node from other proxy nodes, an IP address of the container host, an IP address of the host master on the container host side, a topic name on the container host side, an IP address of the container guest, an IP address of the guest master on the container guest side, a topic name on the container guest side, a queue size of data transmitted and received by the proxy node, or a node performing data transmission.

The proxy manager starts a proxy node on the basis of information registered in a database beforehand (see registration of the application by the developer). Information associated with network segments and information at the time of registration of the application by the developer may be managed in association with any database. However, database management is not necessarily required for implementation. In this case, the associated database is managed not by a process of each proxy node, but by the proxy manager or the application launcher (software starting application), for example.

Figure 10:
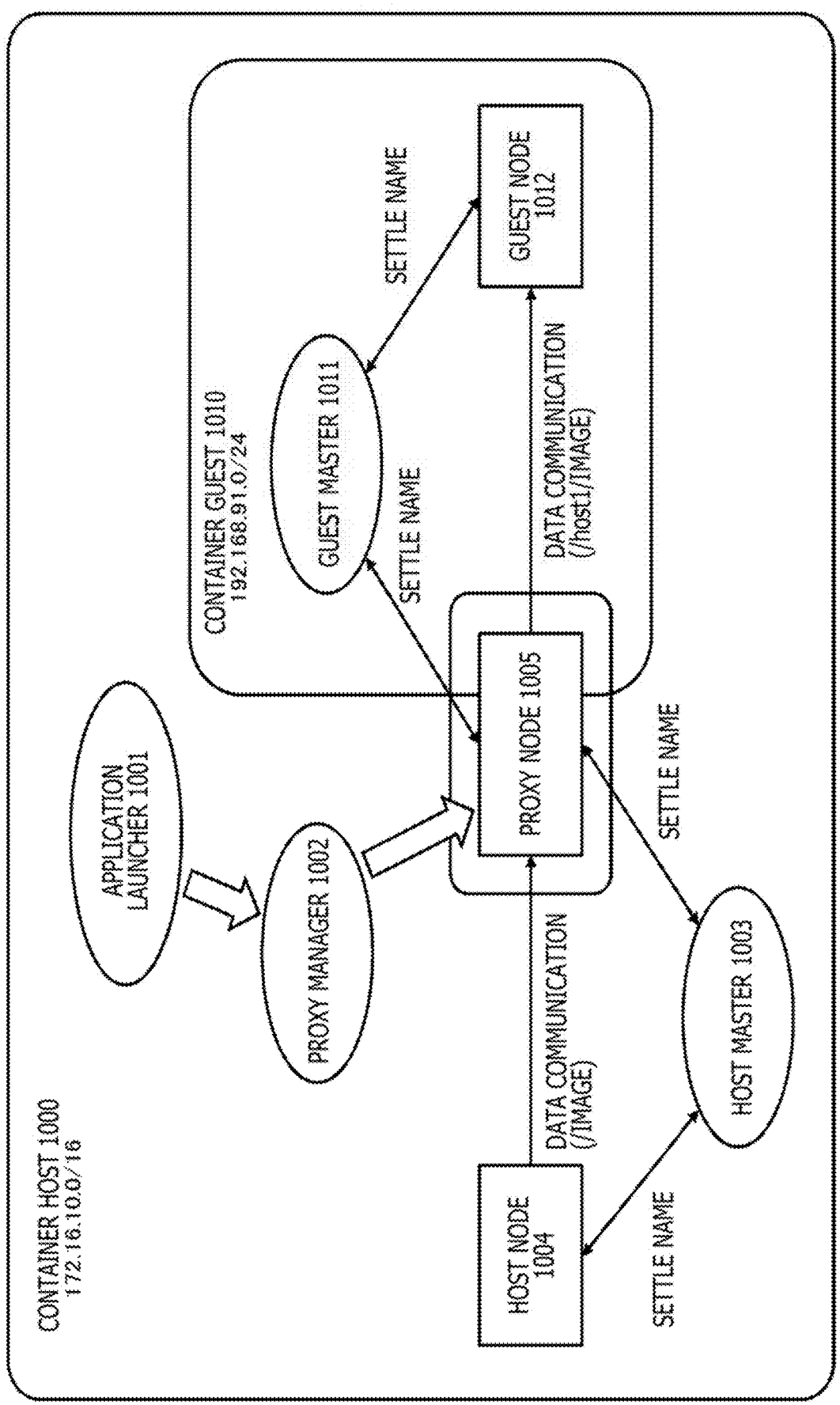
FIG. 10 is a diagram depicting a state that a container guest 1010 is started in a container host 1000.

FIG. 10 depicts a state where a container guest 1010 is started in a container host 1000. A host node 1004 is started by installation of at least one application in the container host 1000.

In the case of installation of an application not meeting a predetermined condition in the system, a container guest 1010 is started to operate the application separately from the host node 1004 operating on the container host 1000 side. Thereafter, the application is installed in the container guest 1010, and operates as a guest node 1012.

An application launcher 1001 starts the container guest 1010, and manages a container virtual network, such as allocation of IP addresses to the container guest 1010, in accordance with the processing procedure depicted in FIG. 9. The application launcher 1001 further calls a proxy manager 1002 at the start of the container guest 1010.

The proxy manager 1002 creates a proxy node 1005 at the time of the start of the container guest 1010. A topic name shared between the container host 1000 and the container guest 1010 is given to each of the host master 1003 on the container host 1000 side, and a guest master 1011 on the container guest 1010 side at the start of the proxy node 1005.

For example, the proxy manager 1002 is a management tool of the proxy node 1005. When a user desires to install an application not meeting the predetermined condition in the system, the user issues a pre-request of an application (host node) used by the application not meeting a predetermined condition, and a necessary topic to the proxy manager 1002 through a console screen of a management tool or the like. Table 3 below presents an example of registration information required by pre-request and stored in a database. Meanwhile, the proxy manager 1002 specifies a topic name used by the container guest 1012 with reference to database information on the basis of the registration information corresponding to pre-request. However, the topic name used by the container guest may be designated by the user at the time of pre-request.

TABLE 3

| APPLICATION NAME | TOPIC NAME |
| --- | --- |
| CAMERA IMAGE APPLICATION | /host1 |
|  | /topicsA |
| ACCELERATION SENSOR | /host1 |
| APPLICATION | /topicsA/* |

The proxy node 1005 manages mapping tables containing items (a) to (d) presented below in a memory (including cache) or a database included in a secondary recording apparatus (described above).

(a) a topic identifier capable of designating the host node 1004

(b) a topic identifier capable of designating the guest node 1012

(c) an address of the container guest 1010

(d) as authentication state (verification) and a security level of the container guest 1010, data transmitted and received during the program update process of the subscriber As described with reference to FIG. 7, according to the publisher/subscriber type communication model, the publisher registers a topic in the master, and the subscriber issues a demand for a topic to the master. When correspondence is established between the publisher and the subscriber (i.e., settlement of the name is achieved) in the master, topic distribution between the publisher and the subscriber is carried out.

The proxy node 1005 operates as a host node on the container host 1000 side in the virtual network space depicted in FIG. 10. Accordingly, when topic correspondence in the host master 1003 is established in a state in which one of the host node 1004 or the proxy node 1005 is the publisher, and in which the other is the subscriber, topic distribution from the host node 1004 to the proxy node 1005, or topic distribution from the proxy node 1005 to the host node 1004 is carried out.

In contrast, the proxy node 1005 operates as a quest node on the container guest 1010 side. Accordingly, when topic correspondence in the guest master 1011 is established in a state in which one of the guest node 1012 or the proxy node 1005 is the publisher, and in which the other is the subscriber, topic distribution from the guest node 1012 to the proxy node 1005, or topic distribution from the proxy node 1005 to the guest node 1012 is carried out.

Each of the container host 1000 and the container guest 1010 is an address or a name space logically separated from each other by a virtual NIC. Accordingly, direct topic distribution between the host node 1004 and the guest node 1012 cannot be performed. However, it is possible to indirectly transmit data between the host node 1004 and the guest node 1012 by starting the proxy node 1005 with designation of a topic name shared with the container guest 1010.

In case of transmission of data from the host node 1004 to the guest node 1012, the proxy node 1005 on the container host 1000 side demands the host master 1003 to transmit a topic name to be distributed to the guest node 1012. Subsequently, the host node 1004 on the container host 1000 side is registered as a publisher in the host master 1003 with the topic name demanded by the guest node 1012. In this case, correspondence between the publisher and the subscriber is established (name settlement is achieved) in the host master 1003, so that topic distribution is carried out from the host node 1004 to the proxy node 1005.

Subsequently, in response to reception of the topic from the host node 1004, the proxy node 1005 as a publisher on the container guest 1010 side registers the topic in the guest master 1011. In this case, correspondence between the publisher and the subscriber is established (name settlement is achieved) in the guest master 1011, so that topic distribution is carried out from the proxy node 1005 to the guest node 1012.

On the other hand, in case of transmission of data from the guest node 1012 to the host node 1004, the proxy node 1005 on the container guest 1010 side demands the guest master 1011 to transmit a topic name registered in the guest master 1011 by the guest node 1012 as a publisher. Subsequently, after correspondence between the publisher and the subscriber is established (name settlement is achieved) in the guest master 1011, topic distribution is carried out from the guest node 1012 to the proxy node 1005.

In addition, the proxy node 1005 as a publisher on the container host 1000 side registers a topic in the host master 1003 with a topic name identical to the topic name demanded to be transmitted from the guest master 1011. Subsequently, assuming that the host node 1004 is registered as a subscriber with the same topic name, correspondence between the publisher and the subscriber is established (name settlement is achieved) in the host master 1003. Accordingly, topic distribution is carried out from the proxy node 1005 to the host node 1003.

Note that name spaces of the container host 1000 and the container guest 1010 are separated from each other. Accordingly, the host master 1003 and the guest master 1011 are allowed to use an identical topic name. However, the communication partner of the topic can be identified from the container guest 1010 side (also from the container host 1000 side) by giving identification information such as prefix (e.g., "/host1"), on the basis of which the communication partner on the container host 1000 side is identifiable, to the topic name of the same topic as the topic of the container host 1000 in the container guest 1010, for example.

The proxy manager 1002 specifies a topic name used by the container guest 1012 from the database on the basis of the registration information corresponding to pre-request received from the user as a management tool of the proxy node 1005. For example, a prefix may be given to a topic name used on the container guest 1012 side in accordance with a desire of the user issuing pre-request.

Figure 11:
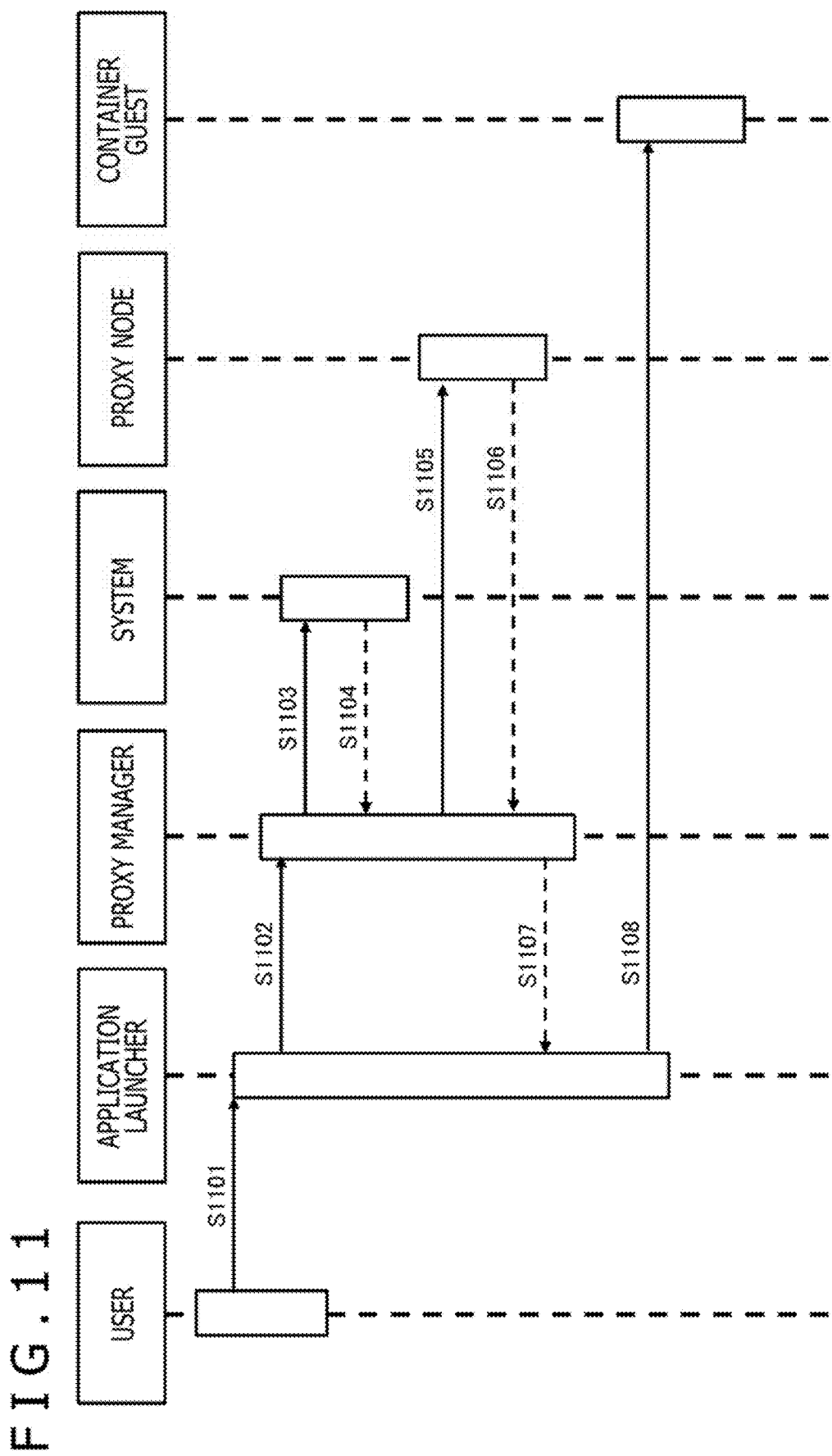
FIG. 11 is a diagram depicting a processing sequence example at a start of a container guest.

FIG. 11 depicts a processing sequence example at a start of a container guest. The processing sequence depicted in the figure is basically executed in accordance with the flowchart presented in FIG. 9.

When a user desires to install an application not meeting a predetermined condition in the system, the user issues a pre-request for an application (host node) used by the application and a necessary topic to a proxy manager corresponding to a management tool of a proxy node (described above).

Subsequently, the user designates a topic name, and demands a start of a container guest with the topic name (S1101) to the application launcher. The user herein is a user who demands installation of an application meeting a predetermined condition, for example.

The application launcher prepares information associated with a virtual network allocated to the container guest, and notifies the proxy manager of the virtual network before starting the container guest (S1102).

The proxy manager asks the system to set a container guest virtual network (S1103). In this case, the system completes setting of the container guest virtual network, and notifies the proxy manager of completion of the setting (S1104).

Subsequently, the proxy manager creates the designated number of proxy nodes to allow communication with the container host side using topic names as information corresponding to pre-request and registered in a database (S1105). FIG. 11 depicts only one proxy node for simplifying the figure. Thereafter, the proxy node thus started notifies the proxy manager of the start (S1106). At the start of the proxy node, a topic name shared with the container guest is also designated on the container host side.

The proxy manager notifies the application launcher of completion of the setting of the container guest virtual network, and completion of the start of the proxy node (S1107).

The application launcher having received the notification from the proxy manager starts a container guest. Thereafter, an application not meeting the predetermined condition is installed in the container guest, and operated as a guest node (S1108).

The proxy node operates as a host node on the container host side. One of the host node or the proxy node is a publisher, while the other is a subscriber. Topic distribution from the host node to the proxy node, or topic distribution from the proxy node to the host node is carried out.

In contrast, the proxy node operates as a guest node on the container guest side. One of the guest node or the proxy node is a publisher, while the other is a subscriber. Topic distribution from the guest node to the proxy node, or topic distribution from the proxy node to the guest node is carried out.

Each of the container host and the container guest is an address or a name space logically separated by a virtual NIC. Accordingly, direct topic distribution between the host node and the guest node cannot be performed. However, data can be indirectly transmitted between the host node and the guest node by starting the proxy node with designation of a topic name shared with the container guest.

For example, there is a case where transmission of image data is desired from a host node corresponding to a "camera image application" operating on the container host side to a guest node corresponding to an "image recognition application" operating on the container guest side. The proxy node on the container host side demands the host master to transmit a topic name "image" to be distributed to the guest node. Thereafter, a host node corresponding to the "camera image application" is registered as a publisher in the host master with the topic name "image." In this case, correspondence between the publisher and the subscriber is established (name settlement is achieved) in the host master, so that topic distribution is carried out from the host node to the proxy node.

A guest node corresponding to the "image recognition application" on the container guest side is registered as a subscriber demanding the guest master to transmit the topic name "image." In response to reception of the topic "image" from the host node, the proxy node as a publisher on the container guest side registers the topic "image" in the guest master. In this case, correspondence between the publisher and the subscriber is established (name settlement is achieved) in the guest mater, so that distribution of the topic "image" is carried out from the proxy node to the guest node.

While topic distribution on the container host side, and topic distribution on the container guest side have been described above in this order for convenience of description. However, the container host and the container guest operate in parallel to each other, so that data communication between the host node and the guest, node may be started from any side.

In addition, name spaces of the container host and the container guest are separated from each other. Accordingly, the host master and the guest master can use an identical topic name. However, the communication partner of the topic can be also identified from the container guest side (also from the container host side) by giving a prefix (e.g., "/host1"), on the basis of which the communication partner on the container host side is identifiable, to the topic name of the same topic as the topic of the container host in the container quest, for example.

Figure 12:
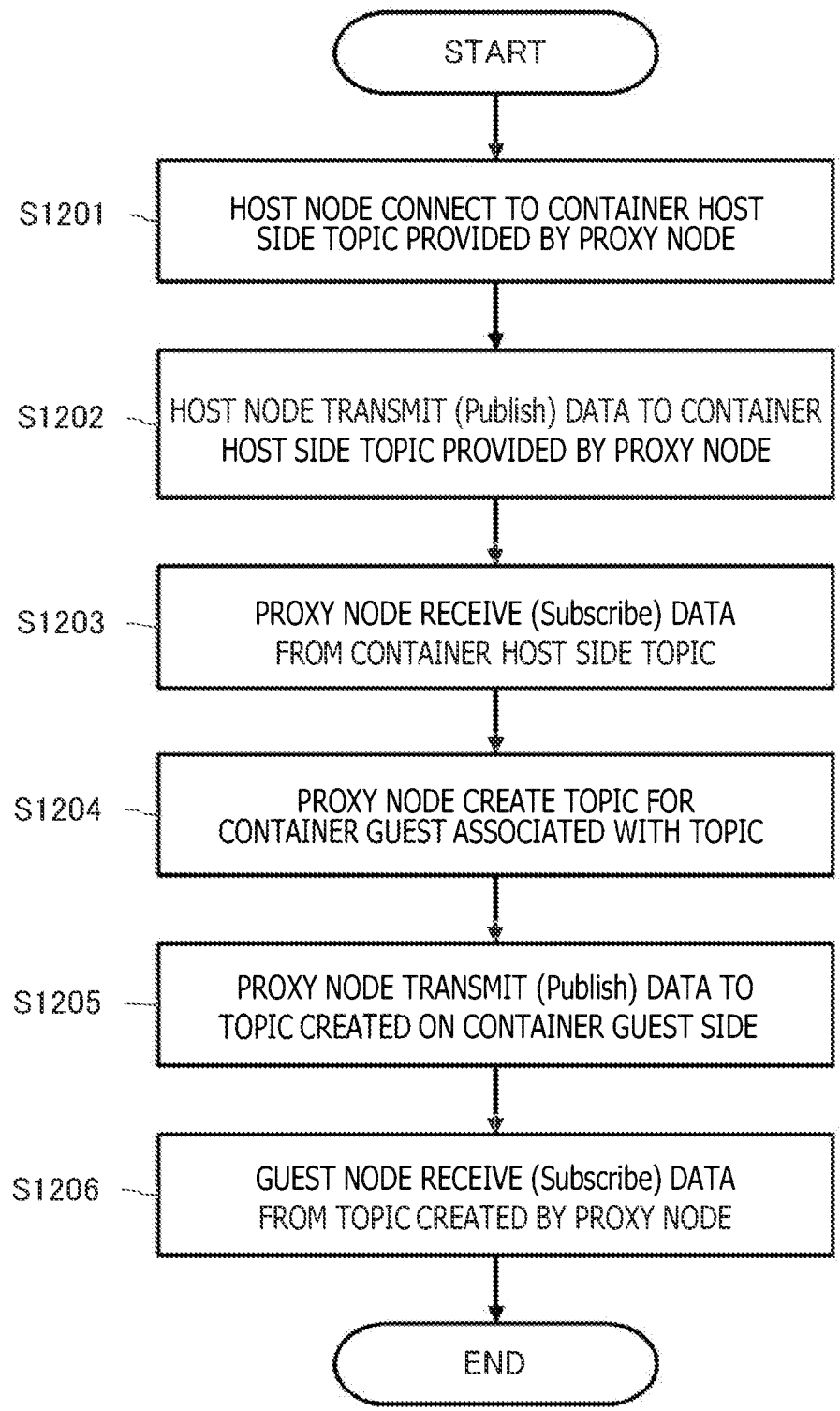
FIG. 12 is a flowchart representing a processing procedure for data transmission from a container host to a container guest.

FIG. 12 depicts a processing procedure for data transmission from a host node of a container host to a quest node of a container guest in the form of a flowchart.

A host node of a container host connects to a "topic" on the container host side provided by a proxy node (i.e., the host node is registered as a publisher in the host master to transmit data associated with the topic to the subscriber of the registered topic) (step S1201).

Thereafter, the host node transmits (publishes) data to the topic provided by the proxy node on the container host side (step S1202).

In contrast, the proxy node receives (subscribes) data associated with the topic provided by the proxy node on the container host side (host master) (step S1203).

The proxy node also creates a corresponding topic in a virtual network associated with the container host, i.e., on the container guest side (guest master) (that is, the proxy node is registered as a publisher of the topic in the guest master to allow data associated with the topic to be transmitted to the subscriber of the registered topic) (step S1204).

Thereafter, the proxy node on the container host side transmits (publishes) data received from the host node to the created topic (step S1205).

In contrast, the guest node on the container guest side (guest master) receives (subscribes) data from the topic created by the proxy node (step S1206), so that data transmitted from the host node can be received.

Figure 13:
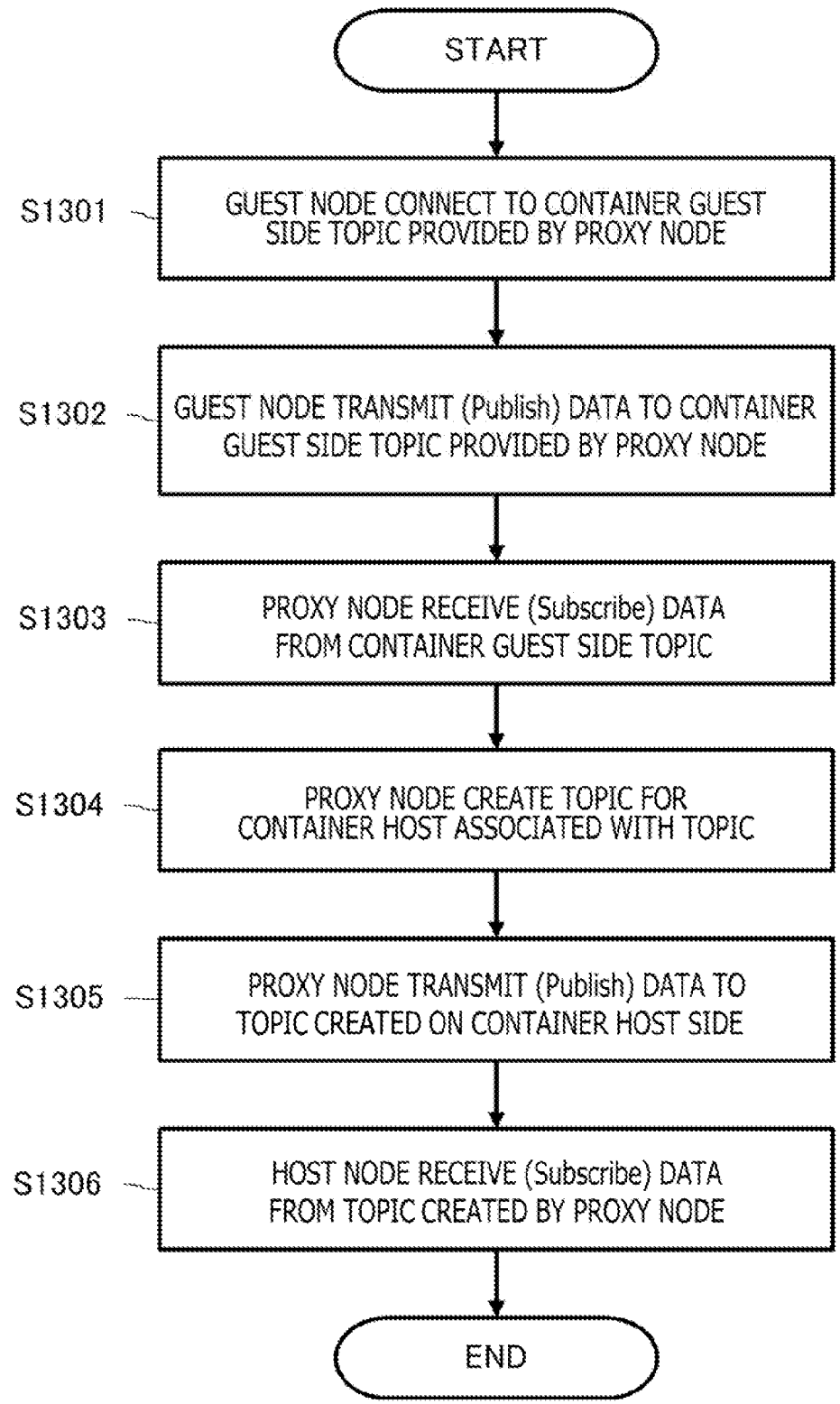
FIG. 13 is a flowchart representing a processing procedure for data transmission from a container guest to a container host.

Also, FIG. 13 depicts a processing procedure for data transmission from a guest node of a container guest to a host node of a container host in the form of a flowchart.

A guest node of a container guest connects to a "topic" provided by a proxy node on the container guest side (i.e., the guest node is registered as a publisher in the guest master to allow data associated with the topic to be transmitted to the subscriber of the registered topic) (step S1301).

Thereafter, the guest node transmits (publishes) data to the topic provided by the proxy node on the container guest side (step S1302).

In contrast, the proxy node receives (subscribes) data associated with the topic provided by the proxy node on the container guest side (guest master) (step S1303).

The proxy node also creates a corresponding topic in a virtual network associated with the container guest, i.e., on the container host side (host master) (that is, the proxy node is registered as a publisher of the topic in the host master to allow data associated with the topic to be transmitted to the subscriber of the registered topic) (step S1304).

Thereafter, the proxy node transmits (publishes) data received from the guest node on the container guest side to the created topic (step S1305).

In contrast, the host node on the container host side (host master) receives (subscribes) data from the topic created by the proxy node (step S1306), so that data transmitted from the guest node can be received.

Figure 14:
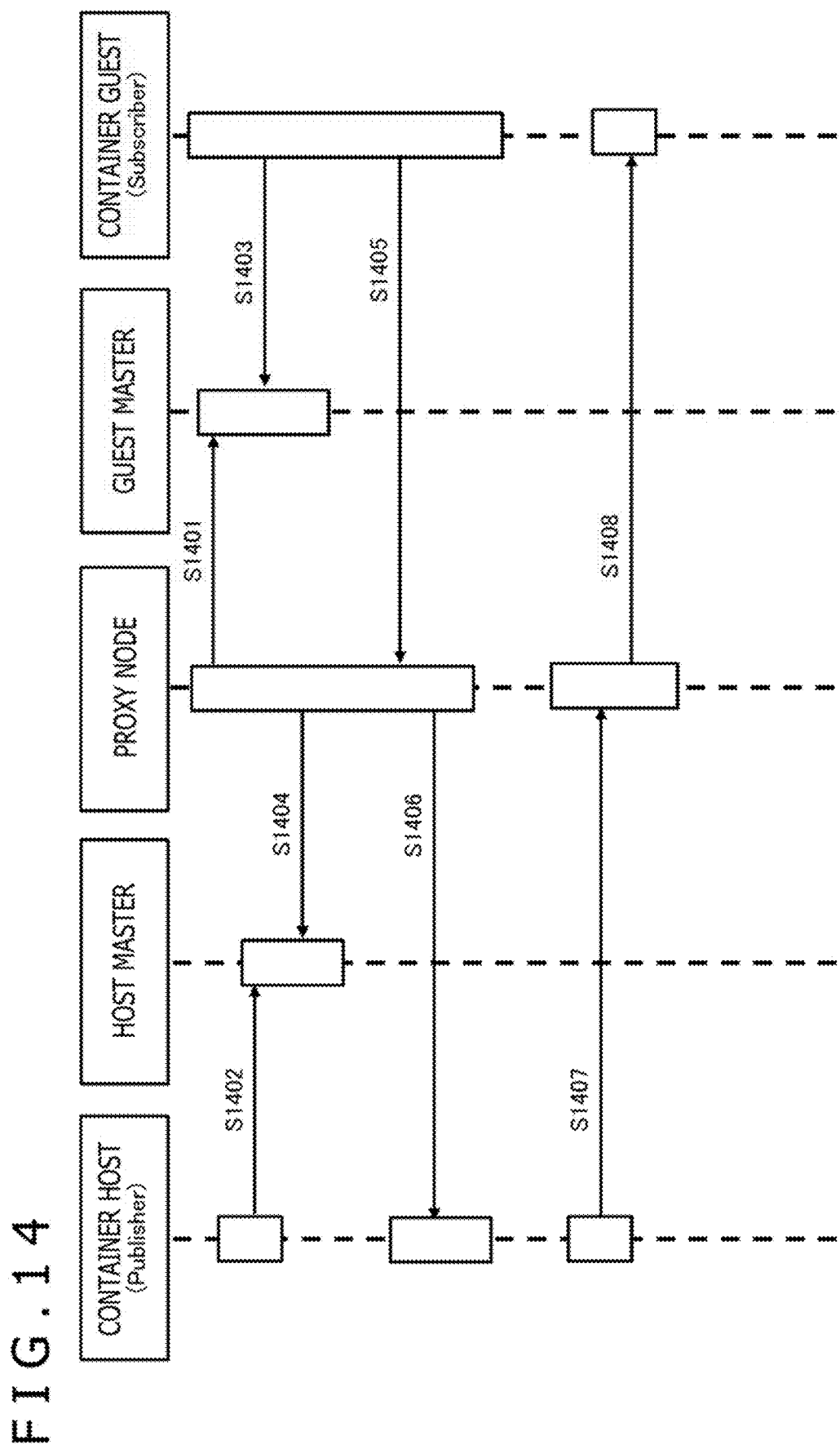
FIG. 14 is a flowchart representing a processing sequence example for data transmission from a container host to a container guest.

FIG. 14 depicts an example of a processing sequence of data transmission from a container host side (not-depicted host node) to a container guest side (not-depicted guest node).

The proxy node registers virtual network information regarding the proxy node in the guest master with a topic name on a container guest side registered by the proxy manager beforehand (S1401).

In addition, the container host as a publisher registers virtual network information regarding the container host in the host master with a topic name on a container host side registered in the proxy manager beforehand (data transmission and reception as a process of the application is executed by a not-depicted host node) (S1402).

In contrast, the container guest as a subscriber waits until the topic name on the container guest side is registered in the proxy manager beforehand is registered in the guest master (data transmission and reception as a process of the application is executed a not-depicted guest node). Thereafter, the container guest acquires the virtual network information regarding the proxy node from the guest master after confirmation of registration of a desired topic name in the guest master (S1403).

In addition, the proxy node waits until the topic name on the container host side registered in the proxy manager beforehand is registered in the host master. Thereafter, the proxy node acquires the virtual network information regarding the container host as the publisher from the host master after confirmation of registration of a desired topic name in the host master (S1404).

Thereafter, the container guest as the subscriber connects to the proxy node on the basis of the virtual network information regarding the proxy node and acquired from the guest master (S1405). Consequently, a communication path between the proxy node and the container guest as the subscriber is completed.

Subsequently, the proxy node connects to the container host on the basis of the virtual network information provided by the host node and acquired from the host master (S1406). Consequently, a communication path between the container host as the publisher and the proxy node is completed.

The container host as the publisher on the container host side transmits data associated with the topic to the proxy node (S1407).

Also, the proxy node on the container guest side transmits data associated with the topic to the container guest as the subscriber (S1408).

It should be understood that a processing sequence for data transmission from the container guest side (guest node) to the container host side (host node) is not depicted herein but can be carried out by a similar procedure.

As described above, respective applications can be grouped using containers logically separated by virtual NICs in accordance with types (e.g., in accordance with whether to meet a predetermined condition, or in accordance with a level at which a condition is suitable). A virtual network is created for each container. Each container (container quest) is isolated from the outside (container host). In addition, a virtual NIC is allocated to each container, while a virtual NIC opposing the virtual NIC of the container is created on the container host side.

Figure 15:
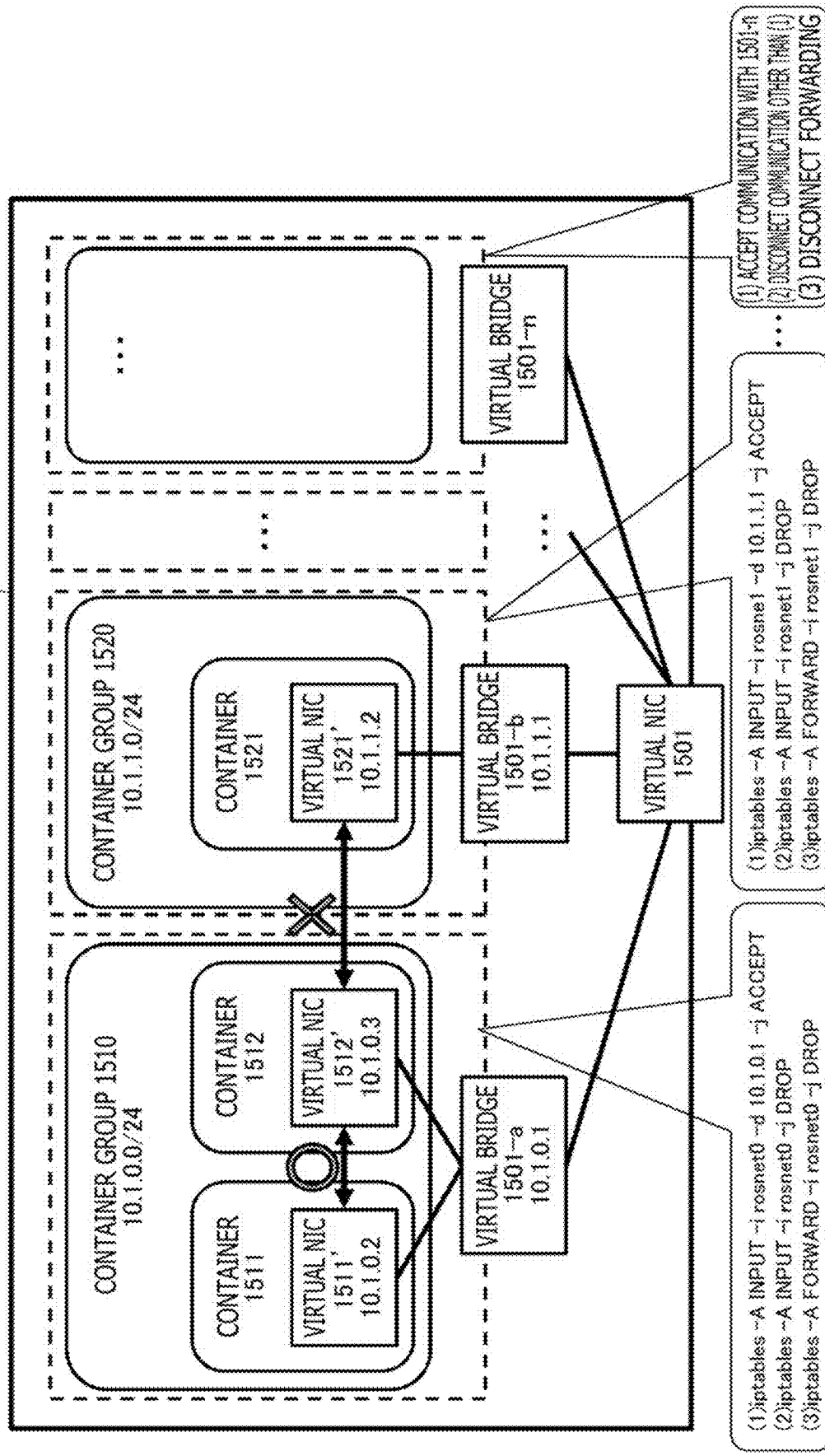
FIG. 15 is a diagram depicting a configuration example of a container network.

FIG. 15 depicts a configuration example of a container network 1500 using virtual NICs. The container network 1500 depicted in the figure includes a plurality of container groups 1510 and 1520 and others. One or more containers (container guests) are started in each of the container groups 1510 and 1520 and others. For example, a container 1511 and a container 1512 are started in the container group 1510, while a container 1521 is started in the container group 1520. It is assumed that the containers are started in accordance with the processing procedure depicted in FIG. 9, for example.

A virtual NIC is allocated to each container and capable of communicating with a virtual NIC disposed on the container host side and opposing the virtual NIC of the corresponding container. In the container group 1510 of the example depicted in FIG. 15, a virtual NIC 1511' is allocated to a container 1511, and a virtual NIC 1512' is further allocated to the container 1511. Also, a virtual NIC 1521' is allocated to a container 1521 in the container group 1520. In addition, a virtual NIC 1501 opposing the virtual NICs of the respective containers is created on the container host side. The virtual NIC 1501 on the container host side can communicate with the virtual NICs 1511', 1512', 1521' and others of the respective containers in the respective container groups via virtual bridges 1501-a, 1501-b and others each created for the corresponding container group.

For example, each of the container groups 1510, 1520 and others is allocated to a corresponding application developer (software vendor). Accordingly, one container group includes a collection of containers in each or which an application meeting a condition (e.g., application developed by an identical developer) is installed and operated as a node.

Communication allowable ranges are surrounded by dotted lines in FIG. 15. Communication between the nodes operating in the respective containers in a container group is achieved by the virtual NICs allocated to the corresponding containers. For example, a node operating in the container 1511 is capable of communicating with a node operating in the container 1512 via the virtual NICs 1511' and 1512' allocated to the containers 1511 and 1512, respectively. In contrast, nodes operating in containers belonging to different groups are included in separated subnets, and therefore do not communicate with each other. For example, communication between the node operating in the container 1512 and the node operating in the container 1521 is impossible via the virtual NICs 1512' and 1521' allocated to the containers 1512 and 1521, respectively.

For example, the foregoing limitation imposed on the communication allowable ranges is achievable by using iptables command or the like for operating settings of packet filtering and network address translation (NAT) function.

Second Embodiment

The system which groups respective applications using containers logically separated by virtual NICs is capable of processing information received from an identical source in accordance with characteristics allocated to each application before transmitting the information. For example, information is degraded in accordance with a security level for each application corresponding to a transmission destination. More specifically, degradation is achieved by changing a topic shared between containers for each container. An example in which a sharing topic is changed for each container is described with reference to FIG. 16.

Figure 16:
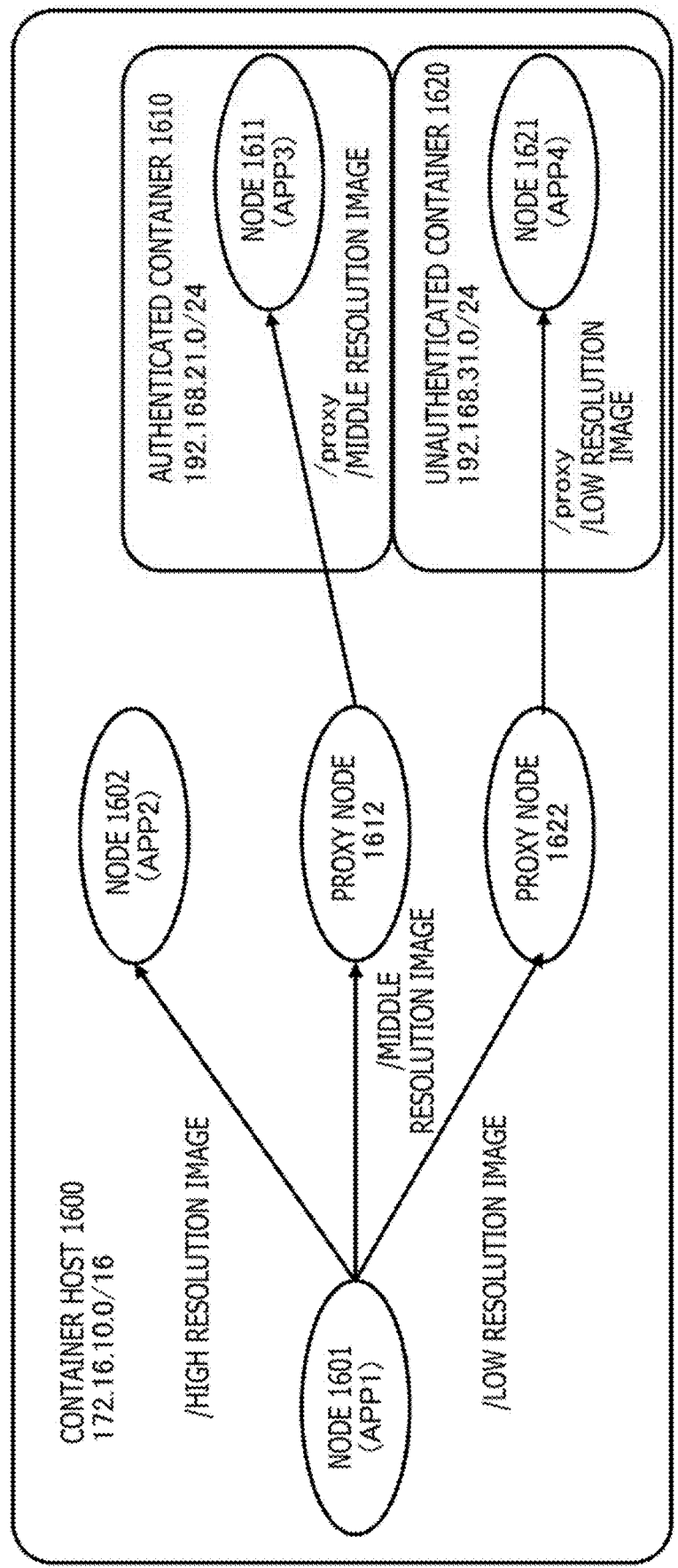
FIG. 16 is a diagram explaining a mechanism for switching a topic shared between containers.

It is assumed in FIG. 16 that an image is distributed from a camera image application to an image recognition application with a sharing topic name as "image."

A camera image application (APP1) and an image recognition application (APP2) each meeting a predetermined condition are installed on the container host 1600 side, and operate as a node 1601 and a node 1602, respectively.

Moreover, an authenticated image recognition application (APP3) provided by a third party is installed in a container guest (authenticated container) 1610, and operates as a guest node (authenticated node) 1611. The authenticated container 1610 shares the topic "image" with the node 1601 via the proxy node 1612.

Furthermore, an unauthenticated image recognition application (APP4) provided by a different third party is installed in a container guest (unauthenticated container) 1620, and operates as a guest node (unauthenticated node) 1621. It is assumed that the respective container guests 1610 and 1620 are started by the processing procedure depicted in FIG. 9, for example. The unauthenticated container 1621 shares the topic "image" with the node 1601 via the proxy node 1622.

It is assumed that the node 1602 operating in the container host 1600 has a high security level. Accordingly, the node 1601 where the camera image application operates, and the node 1602 where the image recognition application operates share a topic "/high resolution image." The node 1601 transmits a high resolution image acquired by the camera image application to the node 1602 without change.

Meanwhile, the authenticated node 1611 operating in the authenticated container 1610 has a middle security level. Accordingly, a topic shared between the node 1601 and the authenticated node 1611 is changed from "/high resolution image" to "/middle resolution image" in accordance with the security level. For example, when a proxy manager (not depicted in FIG. 16) starts a proxy node 1612, "/middle resolution image" is designated as a topic name shared between the container host 1600 and the authenticated container 1610. Consequently, the node 1601 performs processing for lowering resolution of the original high resolution image, and transmits a middle resolution image in response to a demand for a topic from the proxy node 1612. Accordingly, the authenticated node 1611 receives the middle resolution image.

In contrast, the authenticated node 1621 operating in the unauthenticated container 1620 has a low security level. Accordingly, a topic shared between the node 1601 and the unauthenticated node 1621 is changed from "/high resolution image" to "/low resolution image" in accordance with the security level. For example, when the proxy manager (not depicted in FIG. 16) starts a proxy node 1622, "/low resolution image" is designated as the topic name shared between the container host 1600 and the unauthenticated container 1620. Consequently, the node 1601 performs processing for degrading resolution of the original high resolution image, and transmits a low resolution image in response to a demand for a topic from the proxy node 1622. Accordingly, the unauthenticated node 1621 receives the low resolution image.

Table 4 below collectively represents a modified example of a sharing topic in accordance with security levels of containers depicted in FIG. 16.

TABLE 4

| TOPIC NAME (HOST) | TOPIC NAME (CONTAINER) | NETWORK SEGMENT | AUTHEN-TICATION LEVEL |
| --- | --- | --- | --- |
| /MIDDLE RESOLUTION | /proxy /MIDDLE RESOLUTION | 192. 168. 21. 0/24 | SIGNED |
| /LOW RESOLUTION | /proxy / LOW RESOLUTION | 192. 168. 31. 0/24 | UNSIGNED |

Third Embodiment

The system which groups respective applications using containers logically separated by virtual NICs is capable of detecting malfunction, and stopping and restarting an updated or added application in a case where the application causes malfunction during system operation.

Concerning a topic shared with a container guest, the assumed system performs publisher/subscriber type communication between a host node and a proxy node on a container host side, and performs publisher/subscriber type communication between a guest node and the proxy node on the container guest side. Thereafter, when detecting an abnormal value of data received from the guest node which installs an updated or added application and operates under the application, for example, the proxy node on the container host side does not transmit data to the host node, but instructs a stop of the application.

Figure 17:
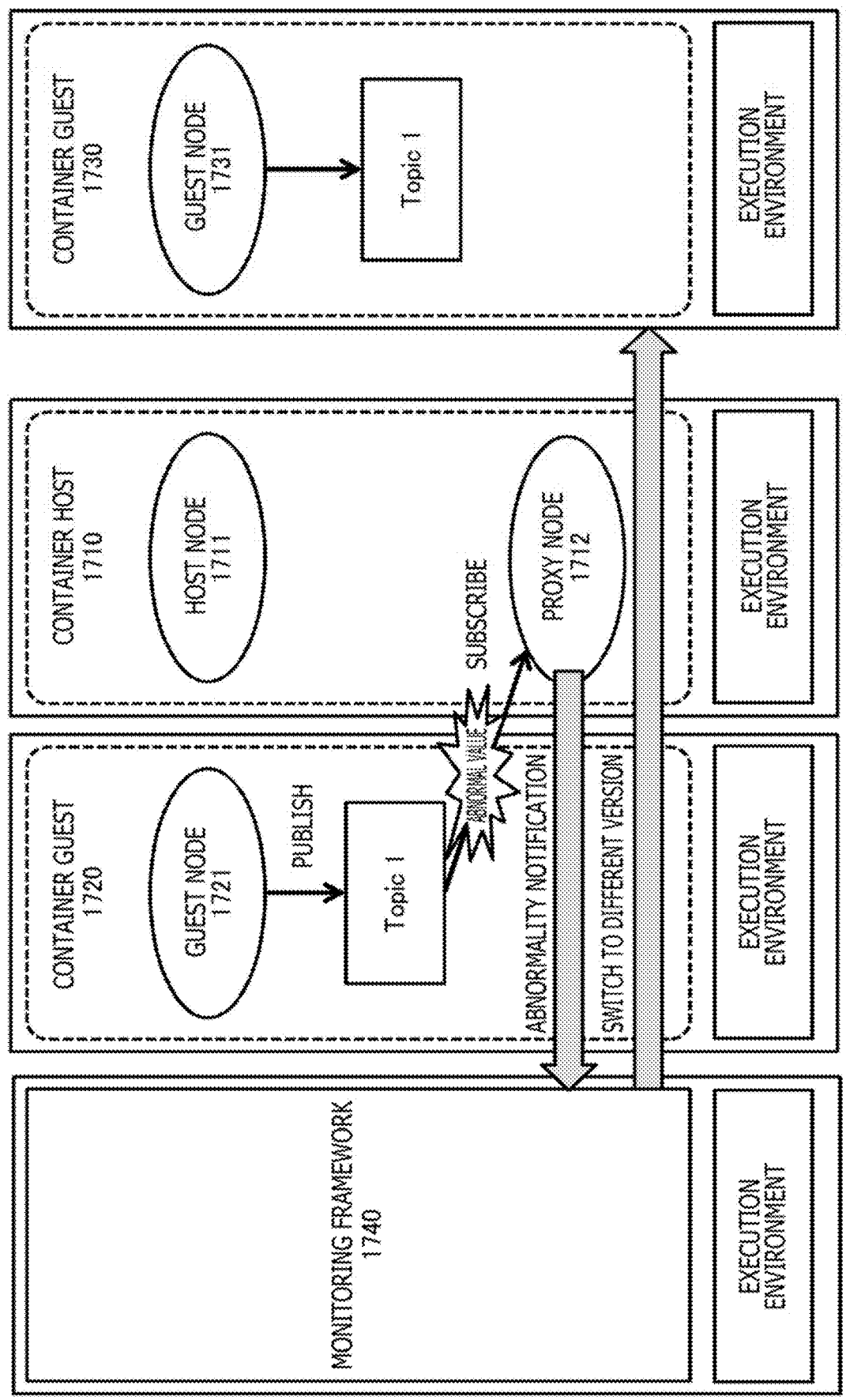
FIG. 17 is a diagram explaining a mechanism for stopping and restarting as application giving output not suited for specifications.

FIG. 17 illustrates a mechanism which stops and restarts an application giving output not suited for specifications by utilizing the method of grouping applications using containers.

A container host 1710 and a container guest 1720 are started in corresponding execution environments. In addition, a monitoring framework (FW) 1740 which monitors operations of the respective containers operates in a corresponding execution environment.

An application meeting a predetermined condition is installed to cause a host node 1711 to operate under the application on the container host 1710 side. In contrast, an application not meeting a predetermined condition is installed to cause a guest node 1721 to operate under the application on the container guest 1720 side. In addition, a proxy node 1712 which designates a topic "Topic1" shared with the container guest 1720 side starts on the container host 1710 side.

On the container guest 1720 side, the guest node 1721 publishes data associated with topic1, and the proxy node 1712 subscribes the data. When the proxy node 1712 detects an abnormal value of data received from the guest node 1721 in this state, the proxy node 1712 notifies a monitoring framework 1740 of abnormality.

When the monitoring framework 1740 detects abnormality of the container guest 1720, or abnormality of the guest node 1721 operating in the container guest 1720, the monitoring framework 1740 stops the guest node 1721, and instantly switches the guest node 1721 to a guest node 1731 operating on a side of a container guest 1730 which is a different container.

The container guest 1730 is a container started in an execution environment having implementation different from implementation of the container guest 1720. Alternatively, the guest node 1731 is a node which operates by installing, in the container guest 1730, an application of a version older and more stable than the application of the guest node 1721.

Figure 18:
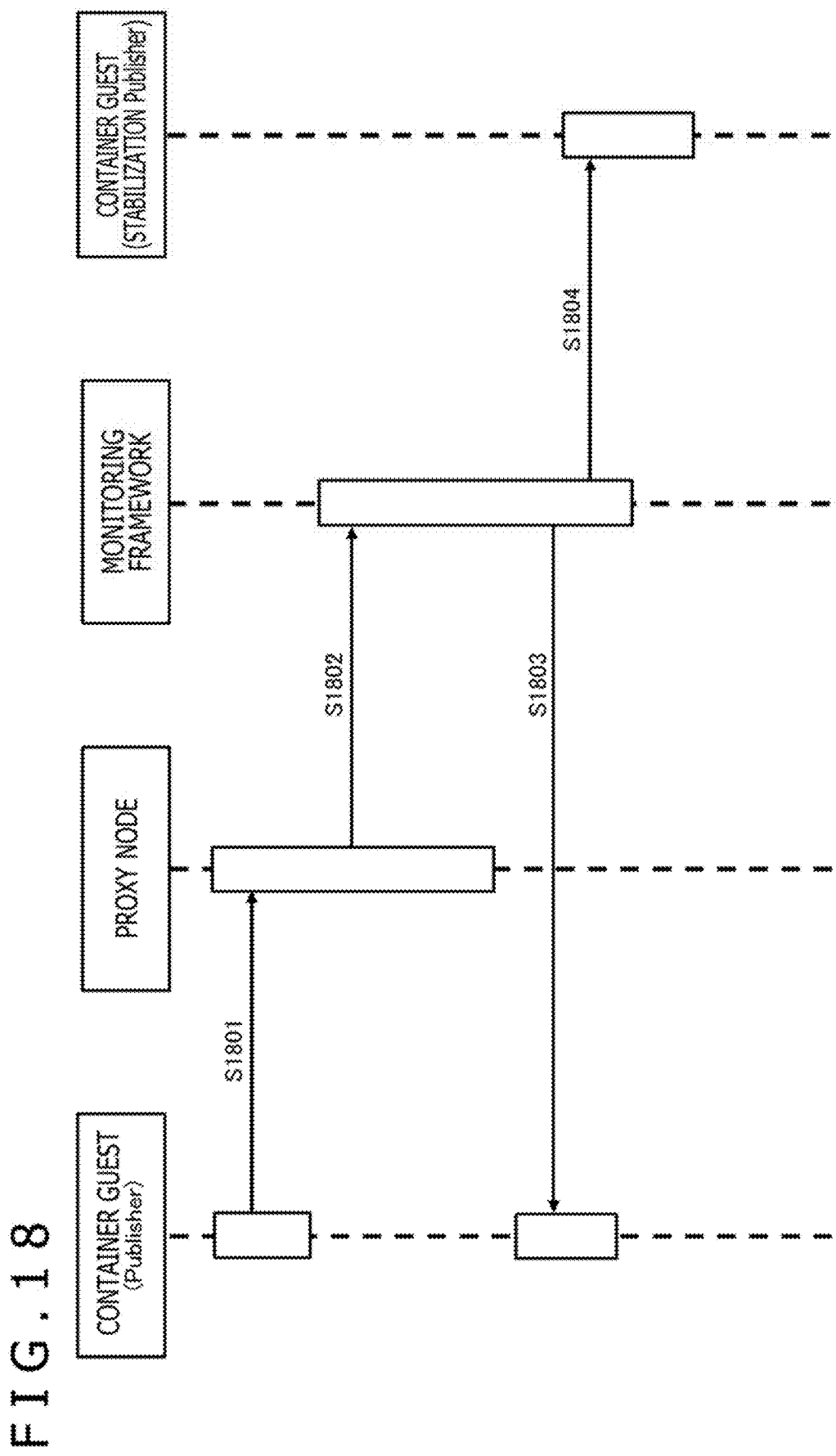
FIG. 18 is a diagram explaining a processing sequence example for stopping and restarting an application giving output not suited for specifications.

FIG. 18 depicts a processing sequence example for stopping and restarting an application giving output not suited for specifications.

Initially, the container guest as a publisher transmits data to the proxy node (data transmission and reception as a process of the application is executed by a not-depicted guest node) (S1801).

The proxy node checks whether the data transmitted from the container guest falls within a specification range of output values specified beforehand. When detecting that the data is out of the specification range of output values, the proxy node notifies the monitoring framework of abnormality of the container guest as the publisher (data transmission and reception as a process of the application is executed by a not-depicted guest node) (S1802).

The monitoring framework instructs a stop of the container guest (guest node) which is the publisher causing abnormality in response to the notification of abnormality from the proxy node (S1803).

The monitoring framework further starts the container guest in an execution environment different from the execution environment of the container guest causing abnormality, and installs, in the container guest, an application which is identical to the application of the container guest causing abnormality but is of a version older and more stable to cause the container guest to operate as a stabilization publisher (S1804).

Fourth Embodiment

The system which groups respective applications using containers logically separated by virtual NICs is capable of safely updating or adding an application or a program included in an application by temporarily storing transmission and reception data associated with an application currently being updated, and restarting connection to the transmission and reception data temporarily stored after update.

Figure 19:
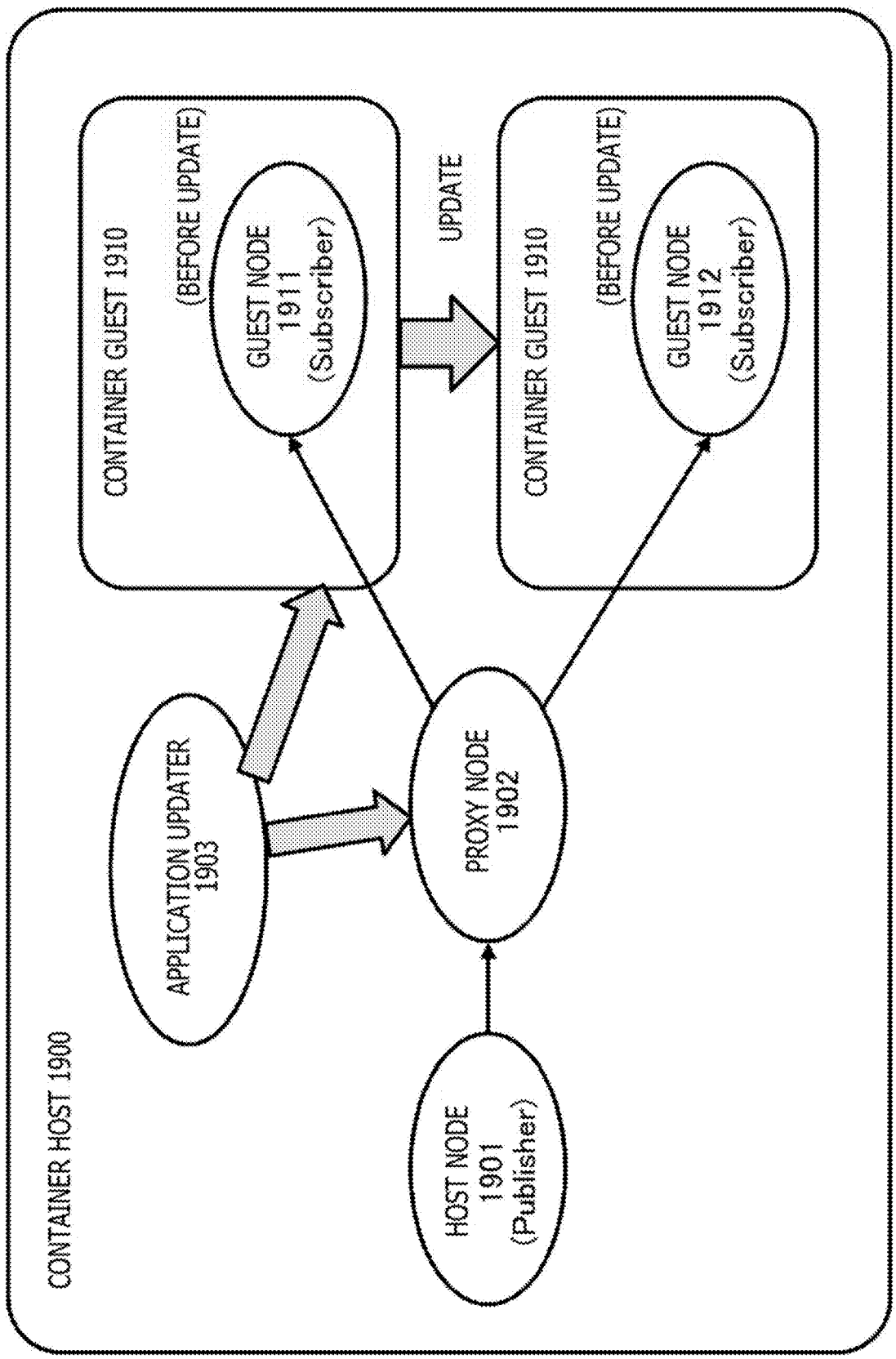
FIG. 19 is a diagram schematically depicting a mechanism for temporarily storing transmission and reception data associated with a guest node during application update.

Concerning a topic shared with a container guest, the assumed system performs publisher/subscriber type communication between a host node and a proxy node on a container host side, and performs publisher/subscriber type communication between a guest node and the proxy node on the container guest side. When updating an application associated with the guest node currently transmitting data as a publisher, for example, the proxy node temporarily stores data transmitted from the publisher. After completion of update, the guest node reconnects to the proxy node to restart data transmission. In addition, when the proxy node updates an application during data transmission to the guest node connected as the subscriber, for example, the proxy node temporarily stores reception data. After completion of update, the proxy node restarts data transmission to the guest node FIG. 19 schematically depicts a mechanism for temporarily storing transmission and reception data associated with a guest node during updating an application. It is assumed in the figure that a proxy node 1902 starts on the container host 1900 side with designation of a topic name shared with the container guest 1910. In this case, it is assumed that a proxy node 1902 receives data transmitted from a host node 1901 as a publisher, and transfers the data to a guest node 1911 as a subscriber from the proxy node 1902 on the container quest 1910 side. It is further assumed that the guest node 1911 before update is updated to a guest node 1912 by updating or adding an application or a program included in an application.

An application updater 1903 is a management process which has a function of managing update of applications. The application updater 1903 instructs the proxy node 1902 to temporarily store data, which has been transmitted from the host node 1901 as the publisher, in a queue provided by the proxy node 1902 before updating a program associated with the guest node 1911 as the subscriber. In this manner, the data transmitted from the host node 1901 as the publisher is retained in the proxy node 1902 even when a state change such as an end of the subscriber occurs.

Subsequently, the application updater 1903 updates a program associated with the guest node 1911 as the subscriber. After completion of update of the program, the application updater 1903 subsequently notifies the proxy node 1902 of completion of program update.

When receiving the notification of completion of program update from the application updater 1903, the proxy node 1902 restarts transmission of data, which starts from the transmission data received from the publisher (host node 1901) and temporarily stored, to the subscriber (guest node 1912 after update).

Figure 20:
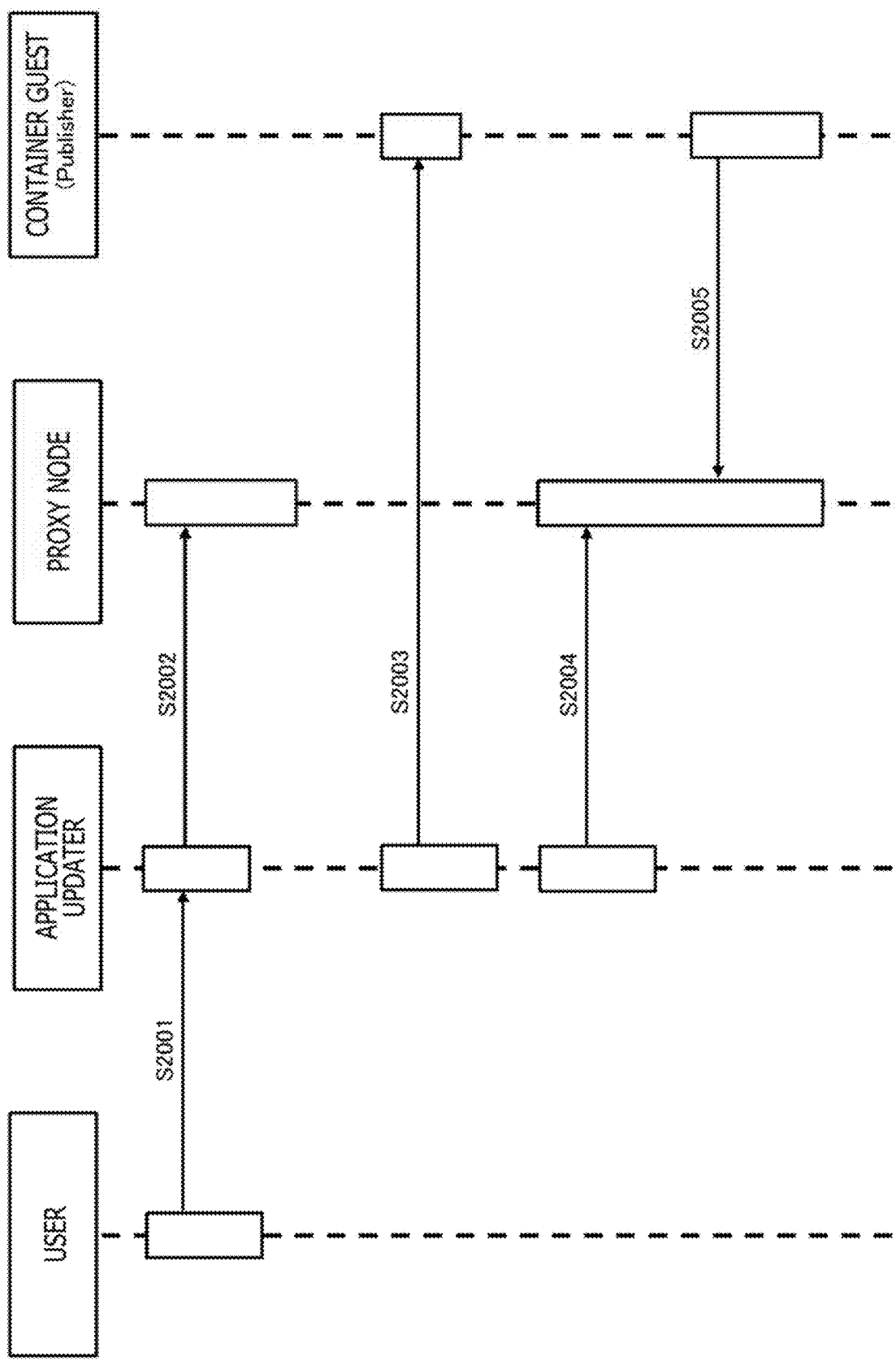
FIG. 20 is a diagram depicting a processing sequence example for temporarily storing transmission and reception data associated with a guest node during updating an application, and restarting data transmission after the application update.

FIG. 20 depicts a processing sequence example for temporarily storing transmission and reception data associated with a container guest (including an update target guest node) during updating an application, and restarting data transmission after the application update. Note that the figure depicts a processing sequence example in a case where the container guest currently being updated (update target guest node) operates as a publisher.

A user demands update of a program associated with a container guest currently operating as a publisher (guest node before update) (S2001).

An application updater instructs a proxy node to temporarily store communication connection to a container guest as a publisher before update (update target guest node) in response to an update demand from the user (S2002). The proxy node temporarily stores data transmitted (published) from the container guest (update target guest node) in response to the instruction from the application updater.

Thereafter, the application updater updates a program associated with the update target guest node in the container guest as the publisher (S2003). It is assumed herein that the program is stored for each version in a specific directory, and that an actual update process is only a process for starting a new program.

After completion of the update process of the program associated with the container guest as the publisher (program corresponding to updated guest node), the application updater subsequently notifies the proxy node of completion of update (S2004).

The publisher (guest node after update in the container guest) reconnects to the proxy node to restart transfer of data (publishing) (S2005). The proxy node further restarts transmission of data, which starts from the data temporarily stored, to the host node in the container host (not depicted).

Figure 21:
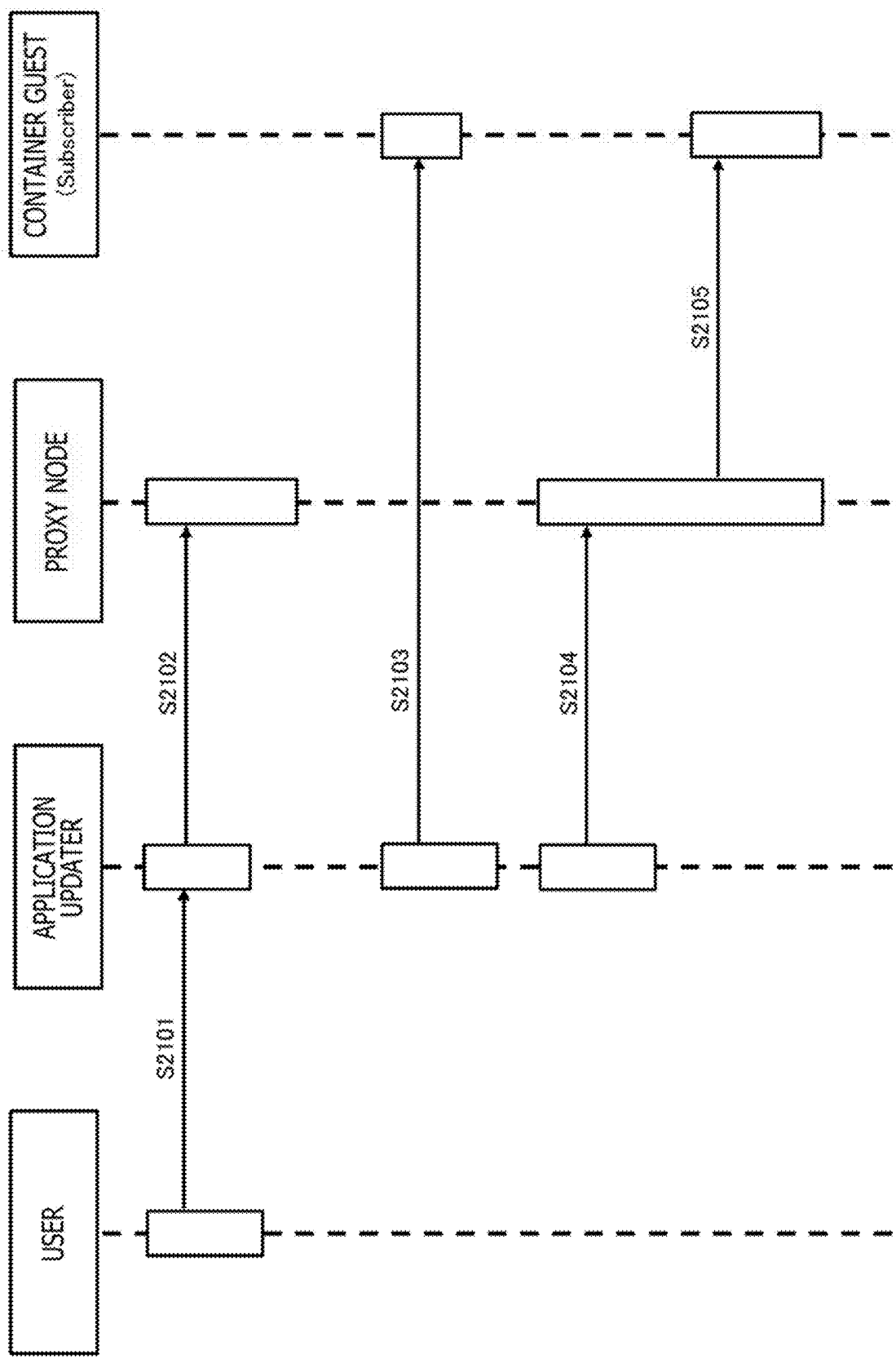
FIG. 21 is a diagram depicting a processing sequence example for temporarily storing transmission and reception data associated with a guest node during updating an application, and restarting data transmission after the application update.

FIG. 21 depicts another processing sequence example for temporarily storing transmission and reception data associated with a container guest (including an update target guest node) during updating an application, and restarting data transmission after the application update. Note that the figure depicts a processing sequence example in a case where the container guest currently being updated (update target guest node) operates as a subscriber.

The user demands update of a program associated with the container guest currently operating as a subscriber (guest node before update) (S2101).

The application updater instructs a proxy node to temporarily store communication connection to a container guest as a subscriber before update (guest node before update) and data received during update in response to an update demand from the user (S2102). The proxy node temporarily stores data transmitted (published) from a host node (not depicted) in a container host and needed to be transferred to the container guest (update target guest node) in response to the instruction from the application updater.

Thereafter, the application updater updates a program associated with the subscriber (update target quest node in the container guest) (S2103). It is assumed herein that the program is stored for each version in a specific directory, and that an actual update process is only a process for starting a new program.

After completion of the update process of the program associated with the subscriber (container guest (guest node)), the application updater subsequently notifies the proxy node of completion of update (S2104).

The proxy node restarts data transmission to the subscriber (guest node after update in the container guest) from the data temporarily stored during update of the subscriber (guest node corresponding to the update target and included in the container guest) (S2105). The proxy node further restarts transmission of data, which starts from the data temporarily stored, to the container guest (guest node after update).

Fifth Embodiment

The system which groups respective applications using containers logically separated by virtual NICs is capable of limiting a data volume transmitted and received between the containers on the basis of a physical level (packet volume) and a logic level (the number of topics used in publisher/subscriber communication).

Concerning a topic shared with a container guest, the assumed system performs publisher/subscriber type communication between a host node and a proxy node on a container host side, and performs publisher/subscriber type communication between a guest node and the proxy node on the container guest side. Uniform allocation of network resources to respective containers is achievable by controlling a communication volume using the proxy node.

A logic level flow rate limitation (application layer level limitation) on the basis of the number of topics is achievable as well as a network flow rate limitation (network layer level limitation) at the time of use of a plurality of vendors (multi-tenants) in a container environment.

In addition, limitation on the basis of the number of topics is achievable in accordance with application characteristics of each container. For example, at a start of the proxy node, a proxy manager sets, to a proxy server, a limitation of a communication volume (e.g., the number of transmission topics or a volume of transmission packets in a fixed period of time) imposed on a guest node in accordance with a user desiring installation of an application (or in accordance with characteristics of the application to be installed in the started container guest, attributes of a developer of the application, or the like). At a start of a plurality of proxy nodes and a plurality of container guests, a limitation of the communication volume is set to each of the proxy nodes in accordance with a corresponding application in order to install applications of a plurality of vendors.

Figure 22:
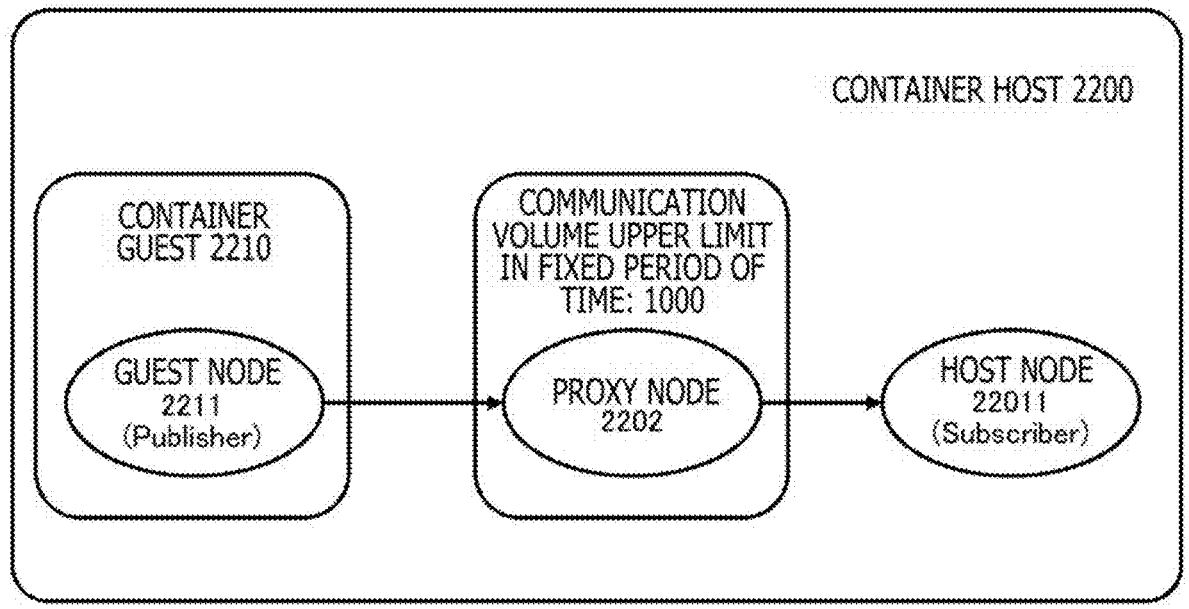
FIG. 22 is a diagram explaining a mechanism for throttling is accordance with a topic communication volume.

FIG. 22 illustrates a mechanism for throttling based on a topic communication volume. This figure depicts a limitation to a data communication volume of a proxy node 2202 from a guest node 2211 (publisher) on the container guest 2210 side to a host node 2201 (subscriber) on the container host 2200 side.

Figure 23:
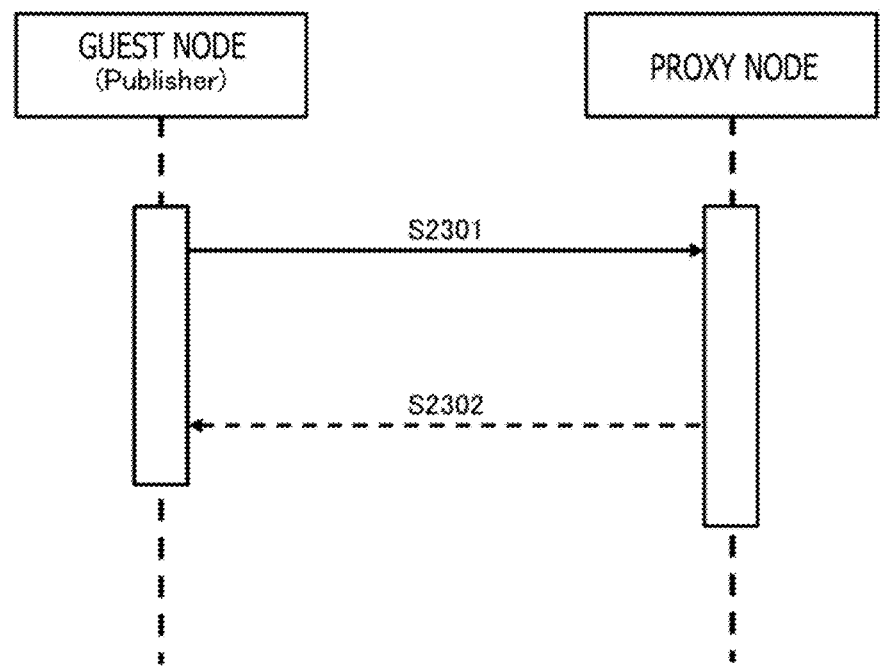
FIG. 23 is a diagram depicting a processing sequence example for throttling in accordance with a topic communication volume.

In addition, FIG. 23 depicts a processing sequence example for throttling based on a topic communication volume.

A container guest operating as a publisher transmits data to a proxy node (S2301).

The proxy node imposes a limitation on a communication volume concerning the number of transmission topics or the volume of transmission packets in a fixed period of time. When data communication exceeding the communication volume limitation is executed from the container guest, the proxy node notifies the guest node corresponding to a transmission source of the excess (S2302).

Sixth Embodiment

Figure 24:
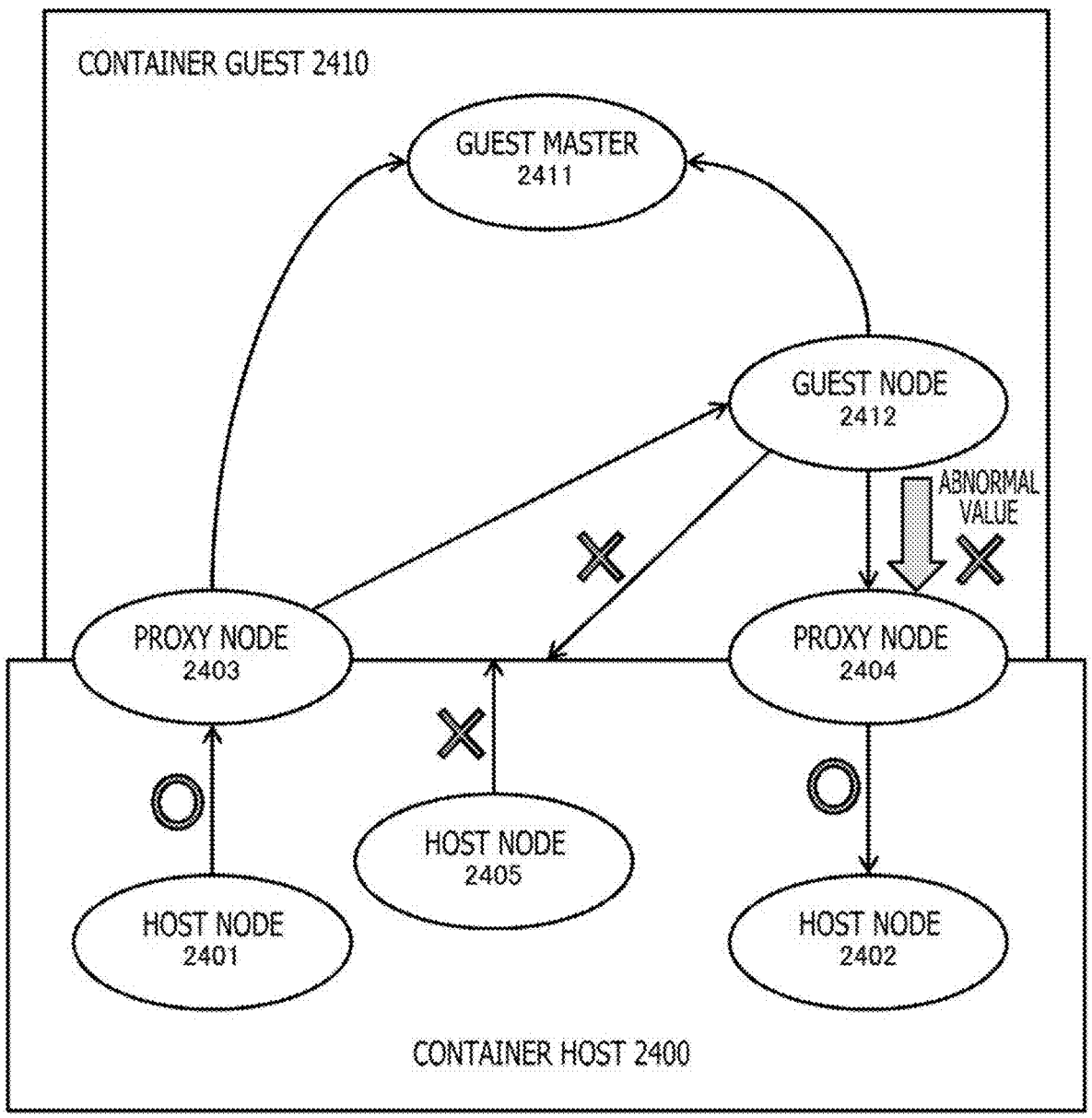
FIG. 24 is a diagram explaining a mechanism for isolating an application not meeting a predetermined condition by grouping using containers.

Described in detail with reference to FIG. 24 is a mechanism for isolating an application not meeting a predetermined condition by grouping using containers.

On the container host 2400 side in FIG. 24, a data transmission application is installed and operates as a host node 2401 (publisher), while a data reception application is installed and operates as a host node 2402.

As a process performed before a start of a container guest 2410, a topic name of a proxy node 2403 (publisher) corresponding to the host node 2401 for data transmission, and a topic name of a proxy node 2404 (subscriber) corresponding to the host node 2402 for data reception are registered in a guest master 2411 in the container guest 2410.

The started container guest 2410 is an address or a name space logically separated by a virtual NIC. An application not meeting a predetermined condition, such as an application provided by a third party, is installed in the container guest 2410, and operates as a guest node 2412. It is assumed herein that the guest node 2412 is registered as a subscriber in the guest master 2411 with a topic name identical to a topic name of the proxy node 2403, and registered as a publisher in the guest master 2411 with a topic name identical to a topic name of the proxy node 2404.

The container guest 2410 is an address or a name space logically separated by a virtual NIC. Accordingly, the container guest 2410 is isolated from the container host 2400. The guest node 2412 is capable of transmitting and receiving data to and from the outside of the container guest 2410, i.e., the container host 2400 side via a topic registered in the guest master 2411 on the container guest 2410 side.

The guest node 2412 is allowed to receive transmission data retained in the host node 2401 from the proxy node 2403 registered in the guest master 2411, but is not allowed to receive data from the host node 2405 operating is the container host 2400 (not registered in guest master 2411).

Moreover, the guest node 2412 is allowed to transmit data to the host node 2402 via the proxy node 2404 by transmitting data to the proxy node 2404 registered in the guest master 2411, but is not allowed to transmit data to the host node 2405 operating in the container host 2400 (not registered in guest master 2411).

In addition, the proxy node 2404 started for data reception from the guest node 2412 checks whether reception data from the guest node 2412 falls within a specification range of output values specified for the application beforehand. Thereafter, as described in the fifth embodiment, the proxy node 2404 performs a coping process such as a stop of the guest node 2412, and a restart of the guest node from an application of an older and more stable version at the time of detection that the data is out of the specification range of output values.

Seventh Embodiment

As already described above with reference to FIG. 6, a large number of application programs classified into "recognition," "situation understanding," "behavior planning," and "behavior control" operate on the autonomous operation apparatus 100 such as a robot, an autonomous vehicle, and an unmanned aerial vehicle.

Figure 25:
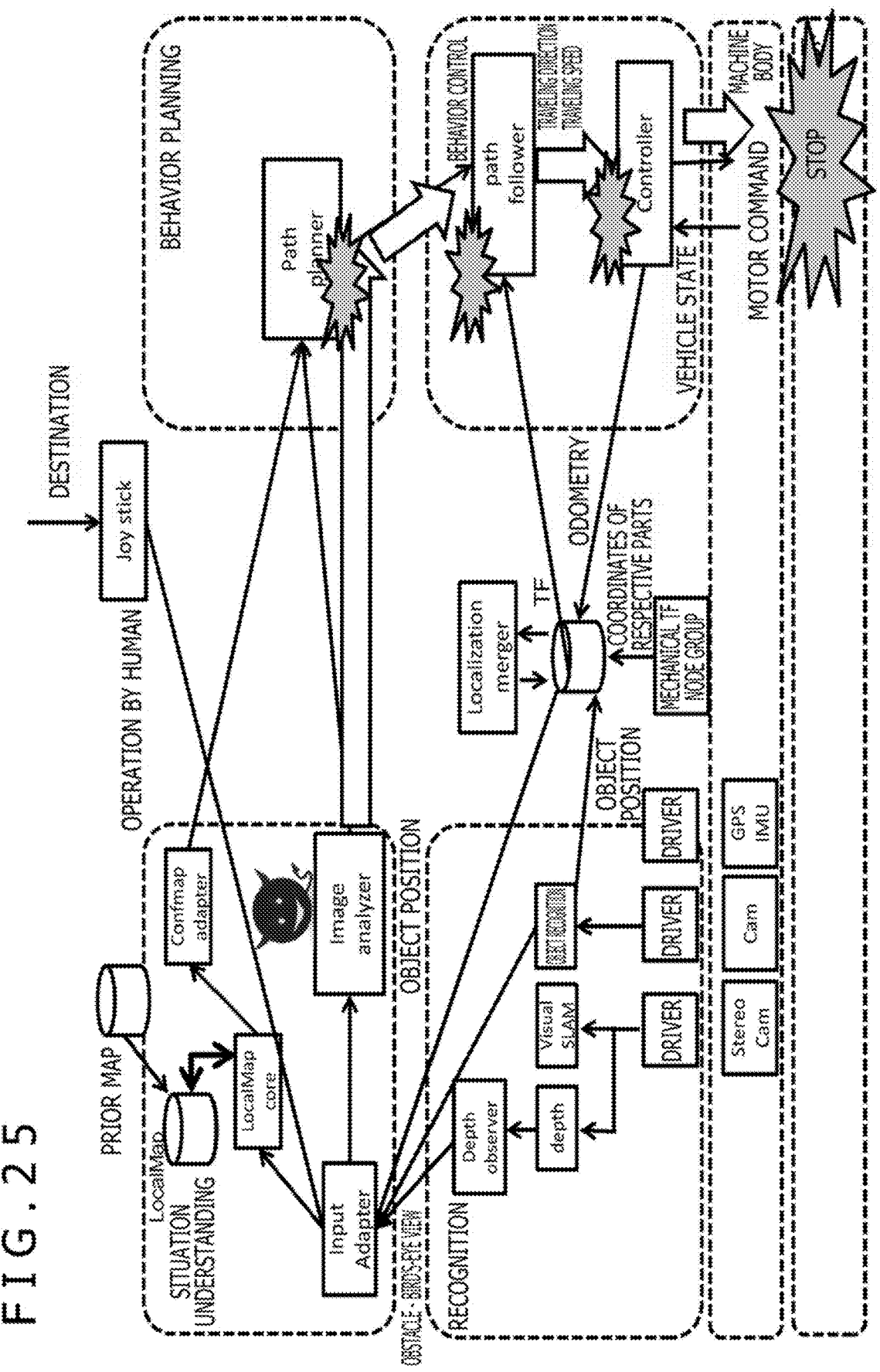
FIG. 25 is a diagram depicting a configuration example of an application program of the autonomous operation apparatus 100 applied to a robot.

FIG. 25 depicts a configuration example of an application program of the autonomous operation apparatus 100 applied to a robot. As depicted in the figure, data acquired from a recognition application is input to an image analysis application "Image Analyzer" having an original algorithm via a situation understanding application "Input Adapter."

When the "Image Analyzer" meets a predetermined condition and guarantees normal operation, the "Image Analyzer" outputs an appropriate image analysis result to a behavior planning application "Path planner." Accordingly, the "Path planner" can select an appropriate operation route of the robot. However, in a case in which the "Image Analyzer" does not meet the predetermined condition, the "Image Analyzer" may output an inappropriate image analysis result to the "Path planner" by ill intention or any bug of a program. In this case, the "Path planner" is unable to select an appropriate operation route of the robot.

Figure 26:
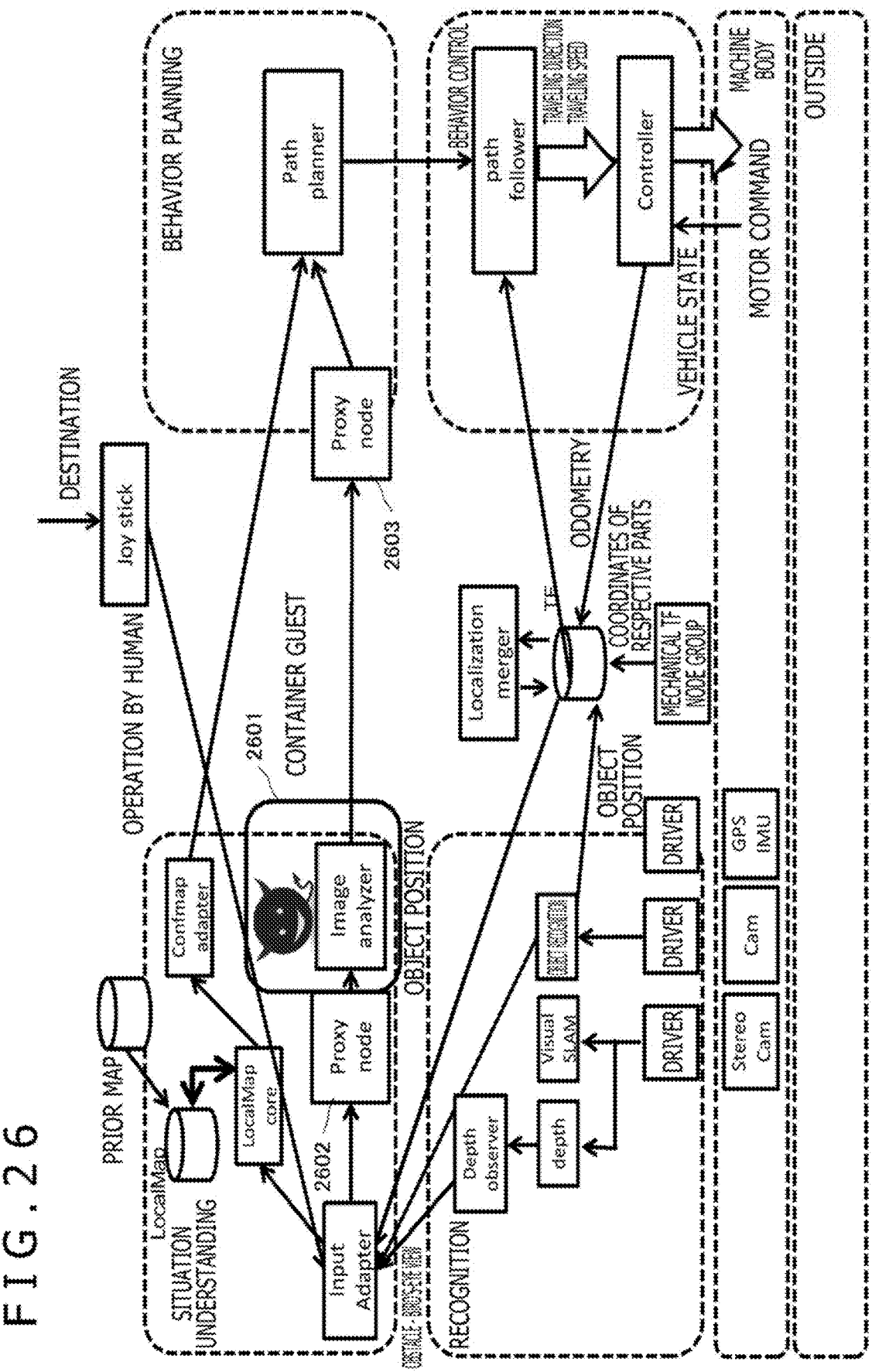
FIG. 26 is a diagram depicting a configuration example of an application program of the autonomous operation apparatus 100 applied to a robot (example of grouping using containers).

Accordingly, grouping using containers is introduced as depicted in FIG. 26. More specifically, a container guest indicated by a reference numeral 2601 is started. The "Image Analyzer" not meeting the predetermined condition is installed in the container guest 2601 and operated as a node isolated from the outside. In addition, proxy nodes indicated by reference numerals 2602 and 2603 are prepared on the input side and the output side of the "Image Analyzer," respectively, to limit data transmitted and received to and from the "Input Adapter" and the "Path planner," thereby preventing output of an inappropriate image analysis result to the "Path planner." In a case where data received from the "Image Analyzer" is out of a specification range of output values specified beforehand, the proxy node 2603 may stop the node of the "Image Analyzer" using the monitoring framework presented in the third embodiment (FIG. 17). In addition, the proxy node 2603 may switch the node of the "Image Analyzer" to a container which includes a different node having an equivalent function by using the monitoring framework.

Eighth Embodiment

Figure 27:
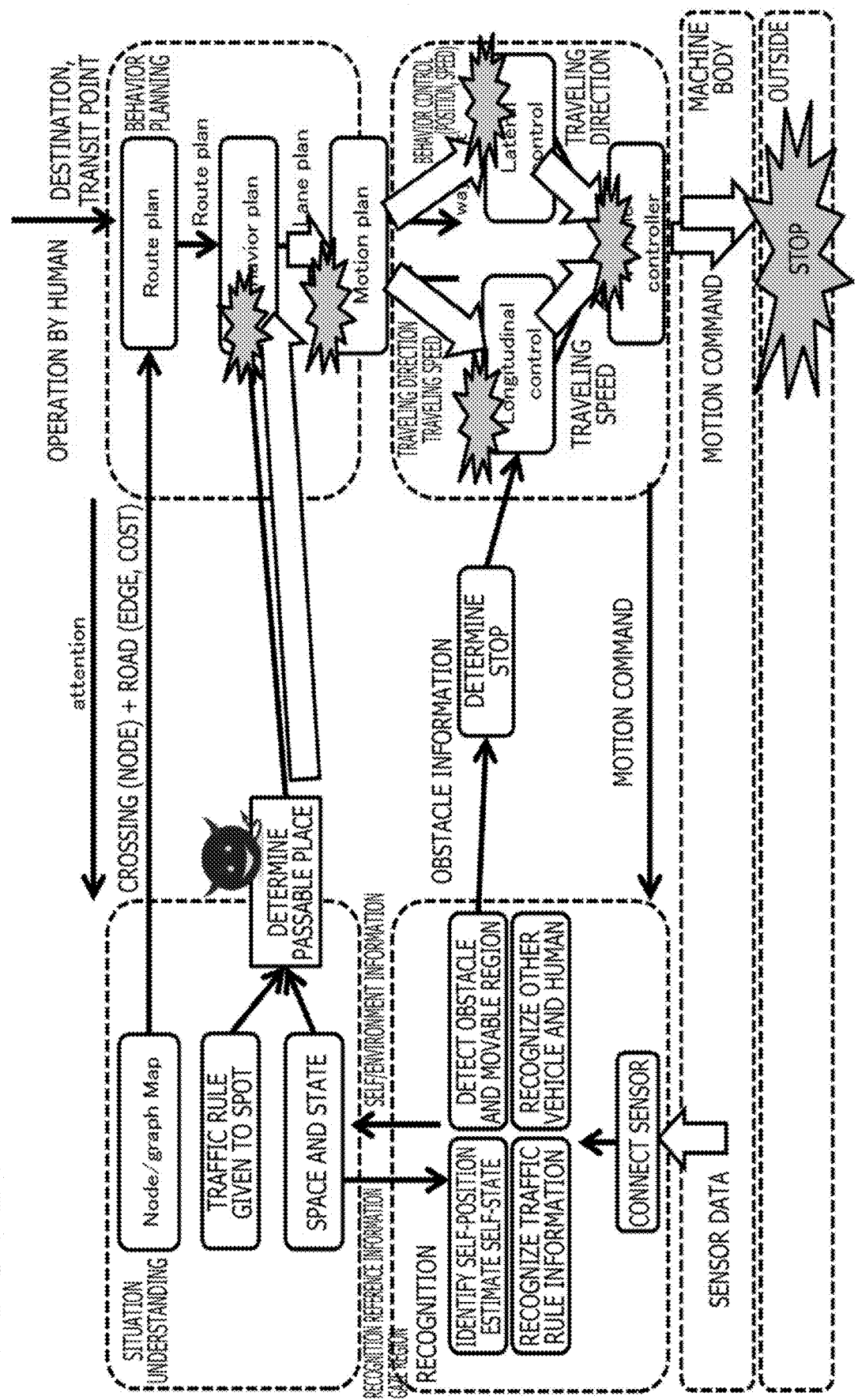
FIG. 27 is a diagram depicting a configuration example of an application program of the autonomous operation apparatus 100 applied to an autonomous vehicle.

FIG. 27 depicts a configuration example of an application program of the autonomous operation apparatus 100 applied to an autonomous vehicle. As depicted in the figure, data output from "traffic rule given to spot" and "space and state" each functioning as a situation understanding application is input to a "passable place determination application."

As long as the "passable place determination application" meets a predetermined condition and guarantees normal operation, a determination result of an appropriate passable place is output to a behavior planning application "Behavior plan." The "Behavior plan" thus can create an appropriate operation planning for the autonomous vehicle. However, in a case where the "passable place determination application" does not meet the predetermined condition and outputs an inappropriate determination result to the "Behavior plan" by ill intention or any bug of a program, the "Behavior plan" is unable to create appropriate operation planning for the autonomous vehicle.

Figure 28:
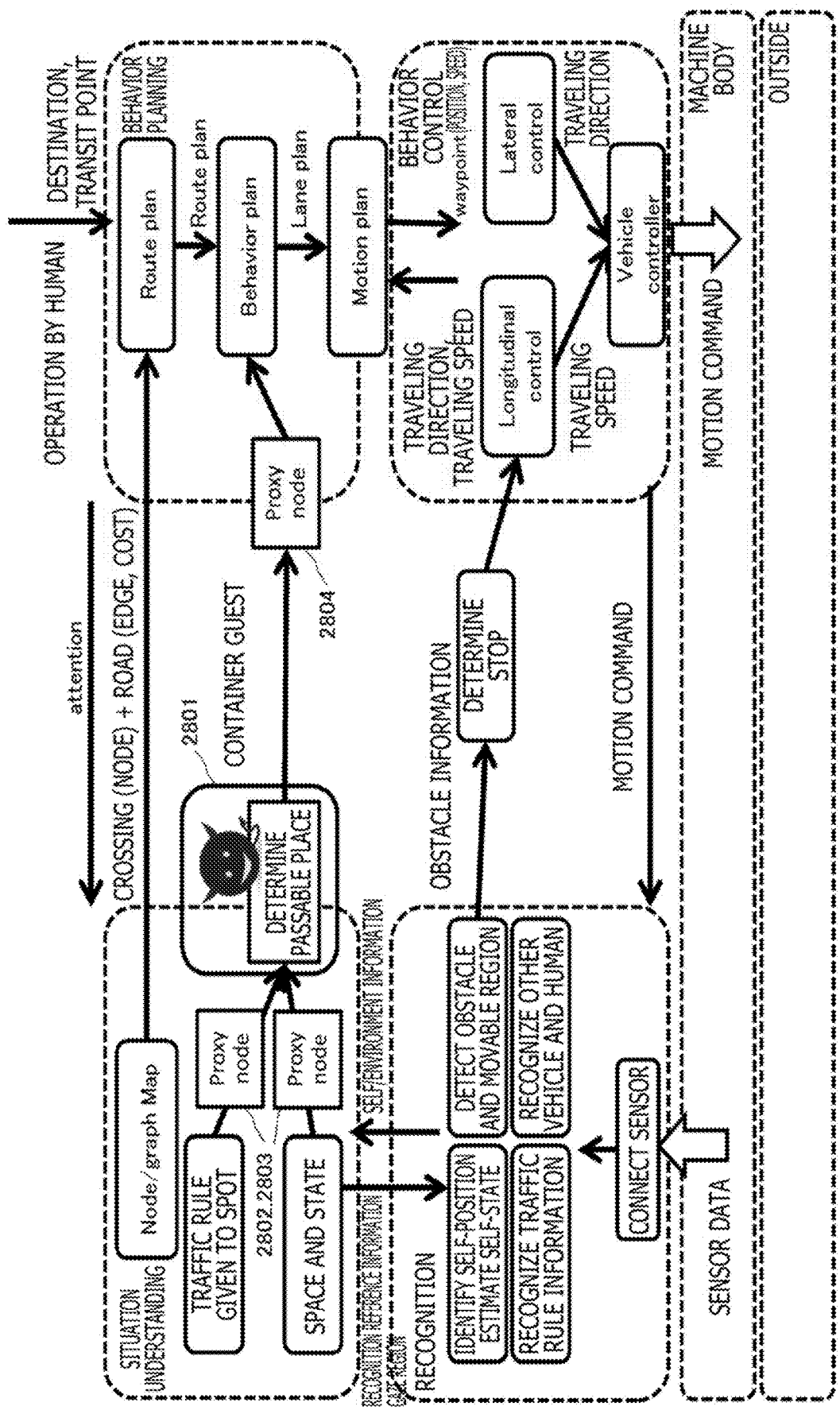
FIG. 28 is a diagram depicting a configuration example of as application program of the autonomous operation apparatus 100 applied to an autonomous vehicle (example of grouping using containers).

Accordingly, grouping using containers is introduced as depicted in FIG. 28. More specifically, a container guest indicated by a reference numeral 2801 is started. The "passable place determination application" not meeting the predetermined condition is installed in the container guest 2601 and operated as a node isolated from the outside. In addition, proxy nodes indicated by reference numerals 2802 and 2803, and a proxy node indicated by a reference numeral 2804 are prepared on the input side and the output side of the "passable place determination application," respectively, to limit data received by the "traffic rule given to spot," and "space and state," and transmitted to the "Behavior plan," thereby preventing output of an inappropriate passable place determination result to the "Behavior plan." The proxy node 2804 may stop a node of "passable place determination application" in a case where data received from the "passable place determination application" is out of a specification range of output values specified beforehand. In addition, the proxy node 2804 may switch the node of the "passable place determination application" to a container which includes a different node having an equivalent function by using the monitoring framework.

Thus, according to the technology disclosed in the present specification, the system using the publisher/subscriber type asynchronous communication model introduces a grouping method called a container method, so that communication can be limited to a component unit (e.g., application) belonging to a container, or a container to which software included in a component unit belongs. According to this technology, any grouping of component units or software included in component units is achievable while maintaining independence of component unit development.

In addition, according to the technology disclosed in the present specification, with use of grouping with containers, it is possible to process information received from an identical source in accordance with characteristics allocated to each component unit (e.g., degrading information in accordance with a security level of each component unit) before transmitting the information.

Moreover, according to the technology disclosed in the present specification, with use of grouping with containers, in a case in which software included in an updated or added component unit causes malfunction during system operation, it is possible to detect the malfunction or the like, and switch to operation of software whose operation has been guaranteed before update or addition of the software causing the malfunction or the like while continuing the system operation.

Furthermore, according to the technology disclosed in the present specification, with use of grouping with containers, it is possible to safely update or add a component unit or software included in a component unit by temporarily storing transmission ant reception data associated with a component unit currently being updated, and restarting connection to data starting from the transmission and reception data temporarily stored after update.

Furthermore, according to the technology disclosed in the present specification, with use of grouping with containers, limitation of a data volume transmitted or received by a component unit is achieved at a physical level (packet volume) and a logical level (the number of topics used for publisher/subscriber communication), and it is possible to uniformly distribute network resources even to respective multi-tenants (in a case where component units are provided for plural vendors).

INDUSTRIAL APPLICABILITY

The technology disclosed in the present specification has been described above in detail with reference to the specific embodiments. However, it is obvious that those skilled in the art can make corrections or substitutions for the embodiments without departing from the subject matters of the technology disclosed in the present specification.

The technology disclosed in the present specification is applicable to an autonomous operation apparatus such as a robot, an autonomous vehicle, and an unmanned aerial vehicle (drone), which operates under an application program installed to implement autonomous or adaptive operations. In addition, the technology disclosed in the present specification is similarly applicable not only to an autonomous operation apparatus, but also to various types of information processing apparatus which installs applications or software included in applications, and to various types of information processing apparatus which performs communication between processes on the basis of a publisher/subscriber type communication model.

In short, the technology disclosed in the present specification has been described by way of example, and the contents of the present specification should not be interpreted in a limited way. The subject matters of the technology disclosed in the present specification should be determined in consideration of the appended claims, Note that the technology disclosed in the present specification may have following configurations.

(1) An information processing apparatus including:

a starting section that starts a second container separated from a first container where a first node operates to start a second node in the second container; and a proxy managing section that starts a proxy node performing data communication with the first node in the first container on the basis of a predetermined communication model, and performing data communication with the second node in the second container on the basis of the predetermined communication model.

(2) The information processing apparatus according to (1) described above, in which the starting section starts the second container including an address or a name space logically separated from the first container by a virtual NIC.

(3) The information processing apparatus according to (2) described above, in which the predetermined communication model includes a publisher/subscriber type communication model, and the starting section designates a topic name shared with the second container to start the proxy node.

(4) The information processing apparatus according to (3) described above, in which the first node transmits data associated with a first topic provided the proxy node in the first container, the proxy node creates a second topic in the second container associated with the first topic, and transmits the data received from the first node, and the second node receives the data from the second topic.

(5) The information processing apparatus according to (3) or (4) described above, in which the second node transmits data associated with a second topic provided by the proxy node in the second container, the proxy node creates a first topic in the first container associated with the second topic, and transmits the data received from the second node, and the first node receives the data from the first topic.

(6) The information processing apparatus according to any one of (1) to (5) described above, in which the first node includes a node operating by installing a first application that meets a predetermined condition in the first container, and the starting section installs a second application that does not meet the predetermined condition in the second container to cause the second node to operate.

(7) The information processing apparatus according to (6) described above, in which the predetermined condition includes at least one of an application developer, an application security level, or application operation verification.

(8) The information processing apparatus according to any one of (1) to (7) described above, in which the first node performs processing for data transmitted to the proxy node in accordance with a characteristic of an application that operates as the second node.

(9) The information processing apparatus according to any one of (1) to (7) described above, in which the first node performs processing for data transmitted to the proxy node in accordance with a topic name shared between the first container and the second container.

(10) The information processing apparatus according to any one of (1) to (9) described above, further including:

a monitoring section that monitors operation of the second node.

(11) The information processing apparatus according to (10) described above, in which the proxy node checks data received from the second node, and notifies the monitoring section of abnormality of the data when the abnormality is detected.

(12) The information processing apparatus according to (10) or (11) described above, in which the monitoring section stops the second node for which abnormality has been detected.

(13) The information processing apparatus according to (12) described above, in which the monitoring section restarts a more stable application than the second node to operate a third node.

(14) The information processing apparatus according to any one of (1) to (13) described above, further including:

an application updating section that updates an application operating as the second node, wherein the application updating section, the proxy node stores transmission and reception data to and from the second node during update of the application, and restarts connection to the second node for transmission and reception of data starting from the stored transmission and reception data after update of the application.

(15) The information processing apparatus according to any one of (1) to (14) described above, in which the proxy node imposes a limitation of a communication volume received from the second node.

(16) The information processing apparatus according to (15) described above, in which when the second node transmits data in excess of the limitation, the proxy node notifies the second node of the excess of the limitation.

(17) An information processing method including:

a starting step of starting a second container separated from a first container where a first node operates to start a second node in the second container; and a proxy managing step of starting a proxy node performing data communication with the first node in the first container on the basis of a predetermined communication model, and performing data communication with the second node in the second container on the basis of the predetermined communication model.

(18) A computer program written in a computer-readable form, causing a computer to function as:

a starting section that starts a second container separated from a first container where a first node operates to start a second node in the second container; and a proxy managing section that starts a proxy node performing data communication with the first node in the first container on the basis of a predetermined communication model, and performing data communication with the second node in the second container on the basis of the predetermined communication model.

REFERENCE SIGNS LIST

100 . . . Autonomous operation apparatus (real machine)
110 . . . Main body
111 . . . Processor
112 . . . Memory
113 . . . Communication modem
114 . . . Battery
115 . . . USB port
116 . . . GPS
120 . . . Module
121 . . . Actuator
122 . . . Processor
123 . . . Memory
124 . . . Sensor
125 . . . Communication modem
200 . . . Development apparatus
210 . . . Computer main body
211 . . . Processor
212 . . . CPU
213 . . . Memory
214 . . . USB port
215 . . . Communication modem
220 . . . Display
230 . . . User interface

The invention claimed is:

1. An information processing apparatus comprising:

a starting section configured to start a second container logically separated from a first container by a virtual Network Interface Card (NIC), wherein a first node operates in the first container to start a second node in the second container;

a proxy managing section configured to start a proxy node performing data communication with the first node in the first container on a basis of a predetermined communication model, and perform data communication with the second node in the second container on the basis of the predetermined communication model; and a monitoring section configured to monitor operation of the second node, wherein the proxy node checks data received from the second node, and notifies the monitoring section of abnormality of data based on detecting the abnormality, the monitoring section is further configured to
stop the second node for which abnormality has been detected, and
restart a more stable application than the second node to operate a third node in a third container, which is logically separated from the first container and the second container by another virtual NIC, and the starting section, the proxy managing section, and the monitoring section are each implemented via at least one processor.

2. The information processing apparatus according to claim 1, wherein
the second container includes an address or a name space.

3. The information processing apparatus according to claim 2, wherein
the predetermined communication model includes a publisher/subscriber type communication model, and
the starting section is further configured to designate a topic name shared with the second container to start the proxy node.

4. The information processing apparatus according to claim 3, wherein
the first node transmits data associated with a first topic provided by the proxy node in the first container,
the proxy node creates a second topic in the second container and transmits the data received from the first node, wherein the second container is associated with the first topic, and
the second node receives the data from the second topic.

5. The information processing apparatus according to claim 3, wherein
the second node transmits data associated with a second topic provided by the proxy node in the second container,
the proxy node creates a first topic in the first container and transmits the data received from the second node, wherein the first container is associated with the second topic, and
the first node receives the data from the first topic.

6. The information processing apparatus according to claim 1, wherein
the first node includes a node operating by installing a first application that meets a predetermined condition in the first container, and
the starting section is further configured to install a second application that does not meet the predetermined condition in the second container to cause the second node to operate.

7. The information processing apparatus according to claim 6, wherein
the predetermined condition includes at least one of an application developer, an application security level, or application operation verification.

8. The information processing apparatus according to claim 1, wherein
the first node performs processing for data transmitted to the proxy node in accordance with a characteristic of an application that operates as the second node.

9. The information processing apparatus according to claim 1, wherein
the first node performs processing for data transmitted to the proxy node in accordance with a topic name shared between the first container and the second container.

10. The information processing apparatus according to claim 1, further comprising:
an application updating section configured to update an application operating as the second node, wherein
the proxy node stores transmission and reception data to and from the second node during update of the application, and restarts connection to the second node for transmission and reception of data starting from the stored transmission and reception data after update of the application, and
the application updating section is implemented via at least one processor.

11. The information processing apparatus according to claim 1, wherein
the proxy node imposes a limitation of a communication volume received from the second node.

12. The information processing apparatus according to claim 11, wherein
when the second node transmits data in excess of the limitation, the proxy node notifies the second node of the excess of the limitation.

13. An information processing method comprising:
starting a second container logically separated from a first container by a virtual Network Interface Card (NIC), wherein a first node operates in the first container to start a second node in the second container;
starting a proxy node performing data communication with the first node in the first container on a basis of a predetermined communication model;
performing data communication with the second node in the second container on the basis of the predetermined communication model;
monitoring, by a monitoring framework, operation of the second node,
wherein the proxy node checks data received from the second node, and notifies the monitoring framework of abnormality of data based on detecting the abnormality;
stopping the second node for which abnormality has been detected; and
restarting a more stable application than the second node to operate a third node in a third container, which is logically separated from the first container and the second container by another virtual NIC.

14. A non-transitory computer-readable medium having embodied thereon a program, which when executed by a computer causes the computer to execute an information processing method, the method comprising:
starting a second container logically separated from a first container by a virtual Network Interface Card (NIC), wherein a first node operates in the first container to start a second node in the second container;
starting a proxy node performing data communication with the first node in the first container on a basis of a predetermined communication model;
performing data communication with the second node in the second container on the basis of the predetermined communication model;
monitoring, by a monitoring framework, operation of the second node,
wherein the proxy node checks data received from the second node, and notifies the monitoring framework of abnormality of data based on detecting the abnormality;

stopping the second node for which abnormality has been detected; and restarting a more stable application than the second node to operate a third node in a third container, which is logically separated from the first container and the second container by another virtual NIC.

* * * * *